US012657798B2

(12) United States Patent
Eguizabal et al.

(10) Patent No.: US 12,657,798 B2
(45) Date of Patent: Jun. 16, 2026

(54) METHODS AND SYSTEMS RELATED TO IMAGE RECONSTRUCTION BASED ON ENERGY-RESOLVED X-RAY DATA

(71) Applicant: Prismatic Sensors AB, Stockholm (SE)

(72) Inventors: Alma Eguizabal, Stockholm (SE); Fredrik Grönberg, Stockholm (SE); Mats Persson, Stockholm (SE)

(73) Assignee: GE Precision Healthcare LLC, Wauwatosa, WI (US)

( * ) Notice: Subject to any disclaimer, the term of this patent is extended or adjusted under 35 U.S.C. 154(b) by 525 days.

(21) Appl. No.: 18/042,279

(22) PCT Filed: Jul. 6, 2021

(86) PCT No.: PCT/SE2021/050685
§ 371 (c)(1),
(2) Date: Feb. 20, 2023

(87) PCT Pub. No.: WO2022/039643
PCT Pub. Date: Feb. 24, 2022

(65) Prior Publication Data
US 2023/0326100 A1     Oct. 12, 2023

Related U.S. Application Data

(60) Provisional application No. 63/067,656, filed on Aug. 19, 2020.

(51) Int. Cl.
A61B 6/42     (2024.01)
A61B 6/00     (2024.01)
G06T 12/20     (2026.01)

(52) U.S. Cl.
CPC ................................. G06T 12/20 (2026.01)

(58) Field of Classification Search
CPC .................................................. A61B 6/4241
See application file for complete search history.

(56) References Cited

U.S. PATENT DOCUMENTS 6,950,492 B2 * 9/2005 Besson .................. A61B 6/541
378/5
9,870,628 B2    1/2018 Gronberg
(Continued)

FOREIGN PATENT DOCUMENTS

JP      2018515160 A      6/2018
JP      2020103571 A      7/2020
WO      2016148616 A1      9/2016

OTHER PUBLICATIONS

M. J. Horry et al., "COVID-19 Detection Through Transfer Learning Using Multimodal Imaging Data," in IEEE Access, vol. 8, pp. 149808-149824, 2020, doi: 10.1109/ACCESS.2020.3016780 (Year: 2020).*

(Continued)

*Primary Examiner* — Amandeep Saini
*Assistant Examiner* — Jaspreet Kaur

(57) ABSTRACT

There is provided a method and corresponding system for image reconstruction based on energy-resolved x-ray data. The method comprises collecting (S1) at least one representation of energy-resolved x-ray data, and performing (S2) at least two basis material decompositions based on said at least one representation of energy-resolved x-ray data to generate at least two original basis image representation sets. The method further comprises obtaining or selecting (S3) at least two basis image representations from at least two of said original basis image representation sets, and processing (S4) said obtained or selected basis image representations by data processing based on machine learning to generate at least one representation of output image data.

33 Claims, 17 Drawing Sheets

(56)                    References Cited

U.S. PATENT DOCUMENTS

| | | | |
|---|---|---|---|
| 11,172,894 B2 | 11/2021 | Taguchi | |
| 11,172,897 B2 | 11/2021 | Kimura | |
| 2018/0068464 A1* | 3/2018 | Gronberg | A61B 6/032 |
| 2020/0196972 A1* | 6/2020 | Zhou | A61B 6/4014 |

OTHER PUBLICATIONS

Application 2023-511887 filed Feb. 16, 2023—Office Action issued Mar. 6, 2024; Machine Translation; 5 pages.

Application 2023-511887 filed Feb. 16, 2023—Office Action issued Oct. 2, 2024, Machine Translation, 6 pages.

International Application No. PCT/SE2021/050685 filed Jul. 6, 2021—International Search Report and Written Opinion issued on Oct. 9, 2021; 14 pages.

Shi et al., "Raw-Data-Based Material Decomposition Using Modified U-Net for Low-Dose Spectral CT", 2019 12th International Congress on Image and Signal Processing, BioMedical Engineering and Informatics (CISP-BMEI), Oct. 19, 2019, IEEE; 5 pages.

JP application 2023-511887 filed Feb. 16, 2023—Office Action issued Oct. 2, 2024, Machine Translation, 6 pages.

* cited by examiner

ResBlock

Fig. 10

PVC

PE

I

METHODS AND SYSTEMS RELATED TO IMAGE RECONSTRUCTION BASED ON ENERGY-RESOLVED X-RAY DATA

CROSS-REFERENCE TO RELATED APPLICATIONS

This is a national stage application under 35 U.S.C. § 371(c) of PCT Application No. PCT/SE2021/050685, filed on Jul. 6, 2021, which claims the benefit of and priority to U.S. Provisional Application No. 63/067,656, filed on Aug. 19, 2020 the disclosures of which are incorporated herein by reference in their entireties.

TECHNICAL FIELD

The proposed technology relates to x-ray technology and x-ray imaging and corresponding imaging reconstruction and imaging tasks. In particular, the proposed technology relates to a method and system for image reconstruction, a corresponding x-ray imaging system and a corresponding computer program and computer-program product.

BACKGROUND

Radiographic imaging such as x-ray imaging has been used for years in medical applications and for non-destructive testing.

Normally, an x-ray imaging system includes an x-ray source and an x-ray detector array consisting of multiple detectors comprising one or many detector elements (independent means of measuring x-ray intensity/fluence). The x-ray source emits x-rays, which pass through a subject or object to be imaged and are then registered by the detector array. Since some materials absorb a larger fraction of the x-rays than others, an image is formed of the subject or object.

A challenge for x-ray imaging detectors is to extract maximum information from the detected x-rays to provide input to an image of an object or subject where the object or subject is depicted in terms of density, composition and structure.

In a typical medical x-ray imaging system, the x-rays are produced by an x-ray tube. The energy spectrum of a typical medical x-ray tube is broad and ranges from zero up to 160 keV. The detector therefore typically detects x-rays with varying energy.

It may be useful with a brief overview of an illustrative overall x-ray imaging system with reference to FIG. 1. In this illustrative, but non-limiting, example the x-ray imaging system 100 basically comprises an x-ray source 10, an x-ray detector system 20 and an associated image processing system or device 30. In general, the x-ray detector system 20 is configured to register radiation from the x-ray source 10, which optionally has been focused by optional x-ray optics and passed an object, a subject or a part thereof. The x-ray detector system 20 is connectable to the image processing system 30 via suitable analog and read-out electronics, which is at least partly integrated in the x-ray detector system 20, to enable image processing and/or image reconstruction by the image processing system 30.

By way of example, an x-ray computed tomography (CT) system includes an x-ray source and an x-ray detector arranged in such a way that projection images of the subject or object can be acquired in different view angles covering at least 180 degrees. This is most commonly achieved by mounting the source and detector on a support that is able to rotate around the subject or object. An image containing the projections registered in the different detector elements for the different view angles is called a sinogram. In the following, a collection of projections registered in the different detector elements for different view angles will be referred to as a sinogram even if the detector is two-dimensional, making the sinogram a three-dimensional image.

A further development of x-ray imaging is energy-resolved x-ray imaging, also known as spectral x-ray imaging, where the x-ray transmission is measured for several different energy levels. This can be achieved by letting the source switch rapidly between two different emission spectra, by using two or more x-ray sources emitting different x-ray spectra, or by using an energy-discriminating detector which measures the incoming radiation in two or more energy levels. An example of such a detector is a multi-bin photon-counting detector, where each registered photon generates a current pulse which is compared to a set of thresholds, thereby counting the number of photons incident in each of a number of energy bins.

A spectral x-ray projection measurement results in a projection image for each energy level. A weighted sum of these projection images can be made to optimize the contrast-to-noise ratio (CNR) for a specified imaging task as described in Tapiovaara and Wagner, "SNR and DQE analysis of broad spectrum X-ray imaging", Phys. Med. Biol. 30, 519.

Another technique enabled by energy-resolved x-ray imaging is basis material decomposition. This technique utilizes the fact that all substances built up from elements with low atomic number, such as human tissue, have linear attenuation coefficients $\mu(E)$ whose energy dependence can be expressed, to a good approximation, as a linear combination of two (or more) basis functions:

$$\mu(E)=a_1f_1(E)+a_2f_2(E). \qquad \text{Equation 1}$$

where $f_i$ are the basis functions and $a_i$ are the corresponding basis coefficients. If there is one or more element in the imaged volume with high atomic number, high enough for a k-absorption edge to be present in the energy range used for the imaging, one basis function must be added for each such element. In the field of medical imaging, such k-edge elements can typically be iodine or gadolinium, substances that are used as contrast agents.

Basis material decomposition has been described in Alvarez and Macovski, "Energy-selective reconstructions in X-ray computerised tomography", Phys. Med. Biol. 21, 733. In basis material decomposition, the integral of each of the basis coefficients, $$A_i=\int_\ell a_i dl \text{ for } i=1,\ldots,N \qquad \text{Equation 2}$$

where N is the number of basis functions, is inferred from the measured data in each projection ray $\ell$ from the source to a detector element. In one implementation, this is accomplished by first expressing the expected registered number of counts in each energy bin as a function of $A_i$:

$$\lambda_i = \int_{E=0}^{\infty} S_i(E)\exp\left(-\sum_{j=1}^{N}A_jf_j(E)\right)dE \qquad \text{Equation 3}$$

Here, $\lambda_i$ is the expected number of counts in energy bin i, E is the energy, $S_i$ is a response function which depends on the spectrum shape incident on the imaged object, the quantum efficiency of the detector and the sensitivity of energy bin i to x-rays with energy E. Even though the term "energy bin" is most commonly used for photon-counting detectors, this formula can also describe other energy resolving x-ray systems such as multi-layer detectors or kVp switching sources.

Then, the maximum likelihood method may be used to estimate $A_i$, under the assumption that the number of counts in each bin is a Poisson distributed random variable. This is accomplished by minimizing the negative log-likelihood function, see Roessl and Proksa, K-edge imaging in x-ray computed tomography using multi-bin photon counting detectors, Phys. Med. Biol. 52 (2007), 4679-4696:

$$\hat{A}_1, \ldots ,$$

$$\hat{A}_N = \arg \min_{A_1, \ldots, A_N} \sum_{i=1}^{M_b} \lambda_i(A_1, \ldots, A_N) - m_i \ln \lambda_i(A_1, \ldots, A_N) \qquad \text{Equation 4}$$

where $m_i$ is the number of measured counts in energy bin i and $M_b$ is the number of energy bins.

When the resulting estimated basis coefficient line integral $\hat{A}_i$ for each projection line is arranged into an image matrix, the result is a material specific projection image, also called a basis image, for each basis i. This basis image can either be viewed directly (e.g. in projection x-ray imaging) or taken as input to a reconstruction algorithm to form maps of basis coefficients $a_i$ inside the object (e.g. in CT). Anyway, the result of a basis decomposition can be regarded as one or more basis image representations, such as the basis coefficient line integrals or the basis coefficients themselves.

However, a well-known limitation of this technique is that the variance of the estimated line integrals normally increases with the number of bases used in the basis decomposition. Among other things, this results in an unfortunate trade-off between improved tissue quantification and increased image noise.

Further, accurate basis decomposition with more than two basis functions may be hard to perform in practice, and may result in artifacts, bias or excessive noise. Such a basis decomposition may also require extensive calibration measurements and data preprocessing to yield accurate results.

There is also a general demand for improvements with regard to x-ray image reconstruction.

SUMMARY

In general, it is desirable to provide improvements with regard to image reconstruction for x-ray imaging applications. It is a particular object to provide improvements with regard to basis decomposition for x-ray imaging. It is a specific object to provide an improved method of image reconstruction. It is also an object to provide an improved system for image reconstruction. It is another object to provide an improved overall x-ray imaging system. It is a further object to provide a corresponding computer program and computer-program product. These and other objects may be achieved by one or more embodiments of the proposed technology.

According to a first aspect, there is provided a method of image reconstruction based on energy-resolved x-ray data, comprising: collecting at least one representation of energy-resolved x-ray data, performing at least two basis material decompositions based on said at least one representation of energy-resolved x-ray data to generate at least two original basis image representation sets, obtaining or selecting at least two basis image representations from at least two of said original basis image representation sets, and processing said obtained or selected basis image representations by data processing based on machine learning to generate at least one representation of output image data.

According to a second aspect, there is provided a system for image reconstruction based on energy-resolved x-ray data. The system is configured to obtain at least one representation of energy-resolved x-ray data. The system is configured to perform at least two basis material decompositions based on said at least one representation of energy-resolved x-ray data to generate at least two sets of basis image representations. The system is further configured to obtain or select at least two basis image representations from at least two of said sets of basis image representation. The system is also configured to process said obtained or selected basis image representations by data processing based on a machine learning system to generate at least one representation of output image data.

According to a third aspect, there is provided a system for image reconstruction based on energy-resolved x-ray data. The system comprises: an input for receiving at least one representation of energy-resolved x-ray data; a basis material decomposition system configured to perform at least two basis material decompositions based on said at least one representation of energy-resolved x-ray data to generate at least two sets of basis image representations; a trained machine learning system having a configuration determined based on input-output-paired training data and adapted to receive at least two basis image representations from at least two of said sets of basis image representation and process the received basis image representations by machine learning-based data processing to generate at least one representation of output image data; and an output for outputting said at least one representation of output image data.

According to a fourth aspect, there is provided an x-ray imaging system comprising a system for image reconstruction according to the second aspect or the third aspect.

According to a fifth aspect, there is provided a computer-program product comprising a non-transitory computer-readable medium having stored thereon a computer program comprising instructions, which when executed by a processor, cause the processor to: obtain at least one representation of energy-resolved x-ray data, perform at least two basis material decompositions based on said at least one representation of energy-resolved x-ray data to generate at least two original basis image representation sets, extract at least two basis image representations from at least two of said original basis image representation sets, and process the extracted basis image representations by data processing based on machine learning to generate at least one representation of output image data.

The proposed technology provides significantly improved image reconstruction by using the resulting basis image representations from two or more basis material decompositions as input to machine learning-based data processing. The technical solution provided by the proposed technology may, by way of example, reduce bias, artifacts and/or noise in the output images and corresponding image representations.

The inventors have realized that it is possible to substantially improve and facilitate the efficiency, operation and/or results of a machine learning process and/or system when performing x-ray image reconstruction. Instead of following the predominant trend of using machine learning on raw image data, the inventors have realized that improved image results can be achieved when utilizing the resulting basis image representations from two or more basis material decompositions as input for the machine learning process and/or system. For example, the improvements may involve reduced bias, artifacts and/or noise, or higher resolution. Another advantage is that the proposed technology reduces the amount of training data required for obtaining image reconstruction with high reliability and quality.

BRIEF DESCRIPTION OF DRAWINGS

The embodiments, together with further objects and advantages thereof, may best be understood by making reference to the following description taken together with the accompanying drawings, in which:

FIG. 10 is a schematic diagram illustrating an example of a ResBlock.

DETAILED DESCRIPTION

For a better understanding, it may be useful to continue with an introductory description of non-limiting examples of an overall x-ray imaging system.

Figure 2:
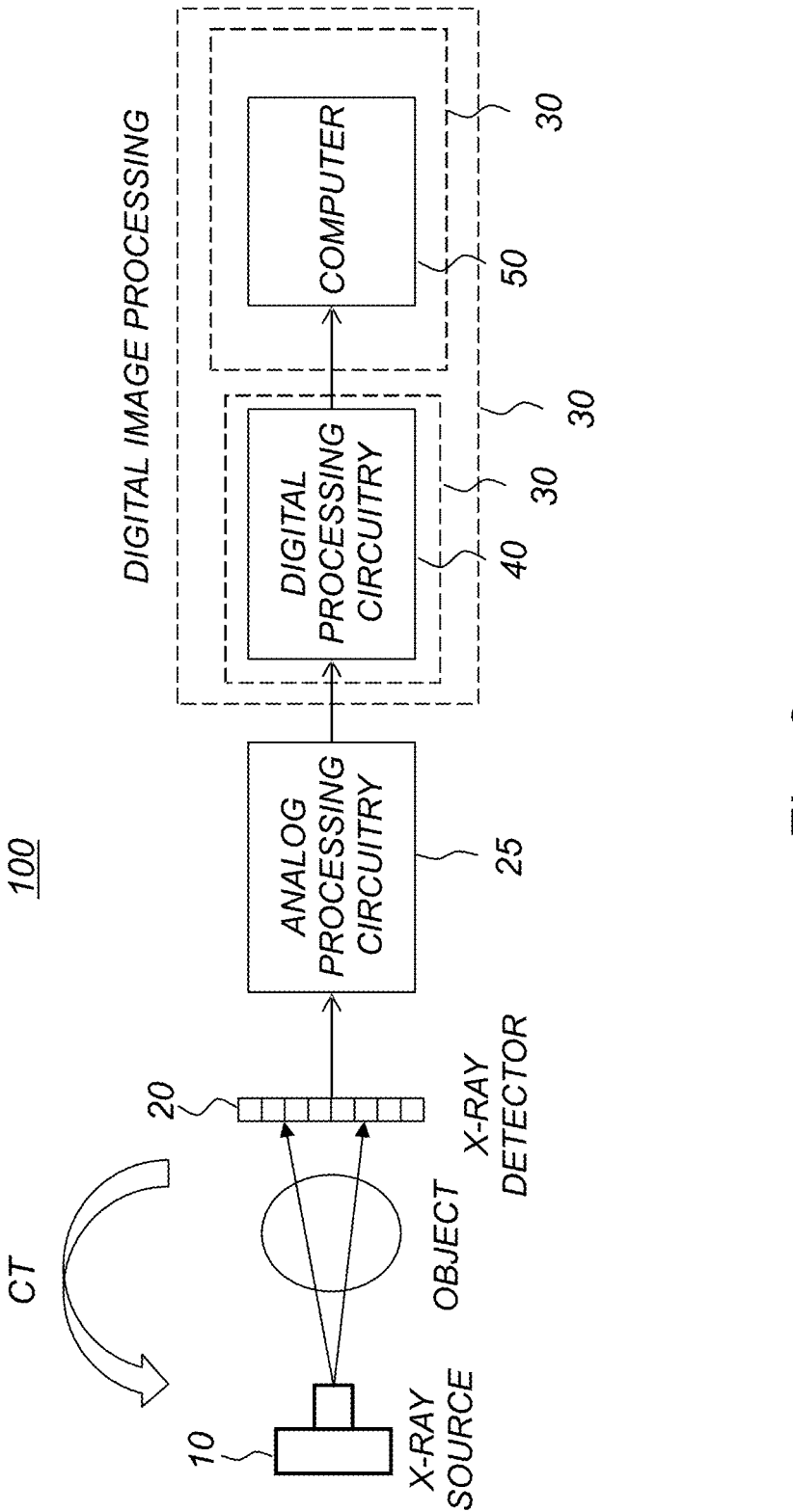
FIG. 2 is a schematic diagram illustrating another example of an x-ray imaging system.

FIG. 2 is a schematic diagram illustrating an example of an x-ray imaging system 100 comprising an x-ray source 10, which emits x-rays, an x-ray detector system 20 with an x-ray detector, which detects the x-rays after they have passed through the object, analog processing circuitry 25, which processes the raw electrical signal from the x-ray detector and digitizes it, digital processing circuitry 40, which may carry out further processing operations on the measured data, such as applying corrections, storing it temporarily, or filtering, and a computer 50, which stores the processed data and may perform further post-processing and/or image reconstruction. According to the invention, all or part of the analog processing circuitry 25 may be implemented in the x-ray detector system 20.

The overall x-ray detector may be regarded as the x-ray detector system 20, or the x-ray detector system 20 combined with the associated analog processing circuitry 25.

The digital part including the digital processing circuitry 40 and/or the computer 50 may be regarded as the image processing system 30, which performs image reconstruction based on the image data from the x-ray detector. The image processing system 30 may, thus, be seen as the computer 50, or alternatively the combined system of the digital processing circuitry 40 and the computer 50, or possibly the digital processing circuitry 40 by itself if the digital processing circuitry is further specialized also for image processing and/or reconstruction.

An example of a commonly used x-ray imaging system is an x-ray computed tomography, CT, system, which may include an x-ray tube that produces a fan- or cone beam of x-rays and an opposing array of x-ray detectors measuring the fraction of x-rays that are transmitted through a patient or object. The x-ray tube and detector array are mounted in a gantry that rotates around the imaged object.

Figure 3:
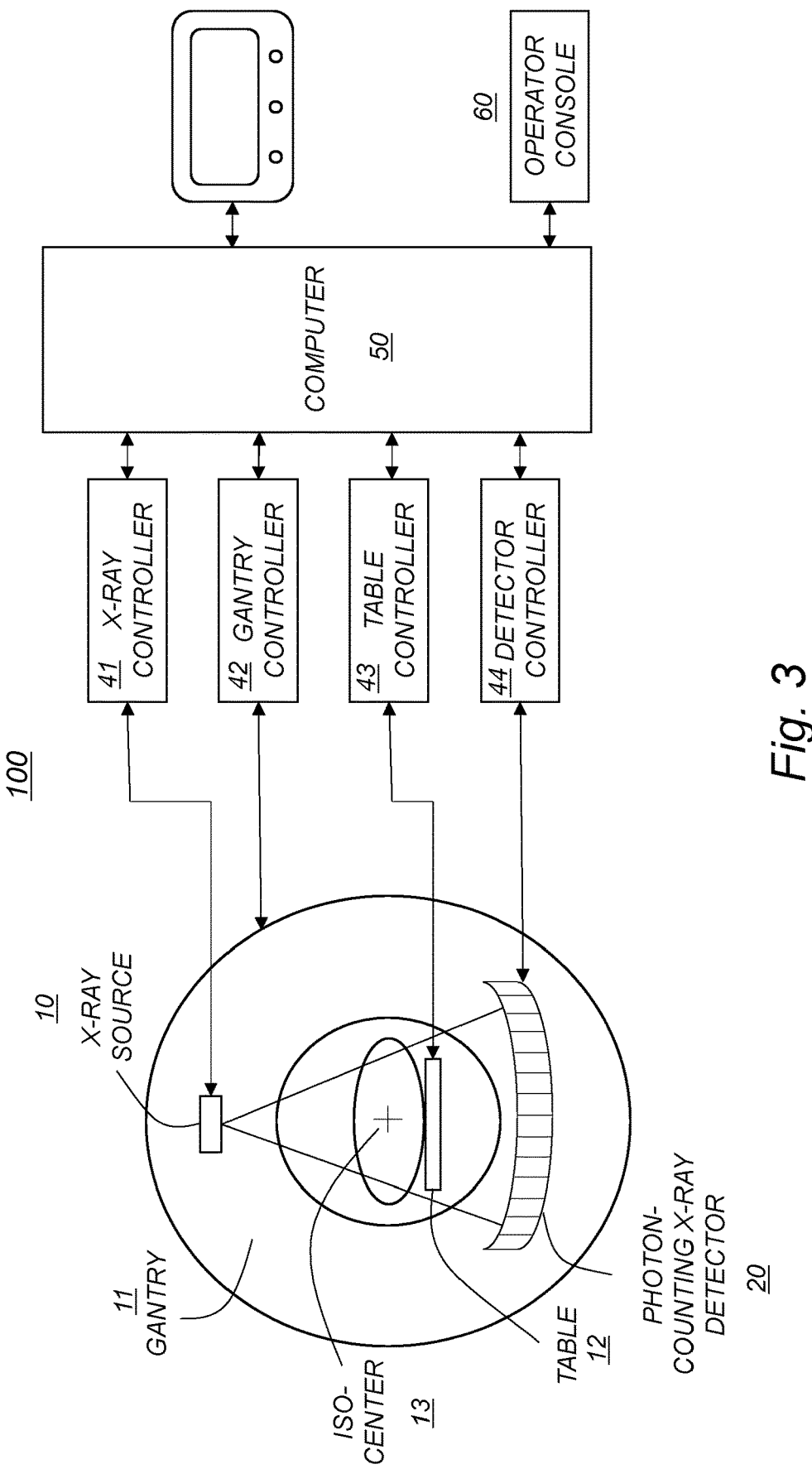
FIG. 3 is a schematic block diagram of a CT system as an illustrative example of an x-ray imaging system.

FIG. 3 is a schematic block diagram of a CT system as an illustrative example of an x-ray imaging system. The CT system comprises a computer 50 receiving commands and scanning parameters from an operator via an operator console 60 that may have a display and some form of operator interface, e.g., keyboard and mouse. The operator supplied commands and parameters are then used by the computer 50 to provide control signals to an x-ray controller 41, a gantry controller 42 and a table controller 43. To be specific, the x-ray controller 41 provides power and timing signals to the x-ray source 10 to control emission of x-rays onto the object or patient lying on the table 12. The gantry controller 42 controls the rotational speed and position of the gantry 11 comprising the x-ray source 10 and the x-ray detector 20. By way of example, the x-ray detector may be a photon-counting x-ray detector. The table controller 43 controls and determines the position of the patient table 12 and the scanning coverage of the patient. There is also a detector controller 44, which is configured for controlling and/or receiving data from the detector 20.

Figure 1:
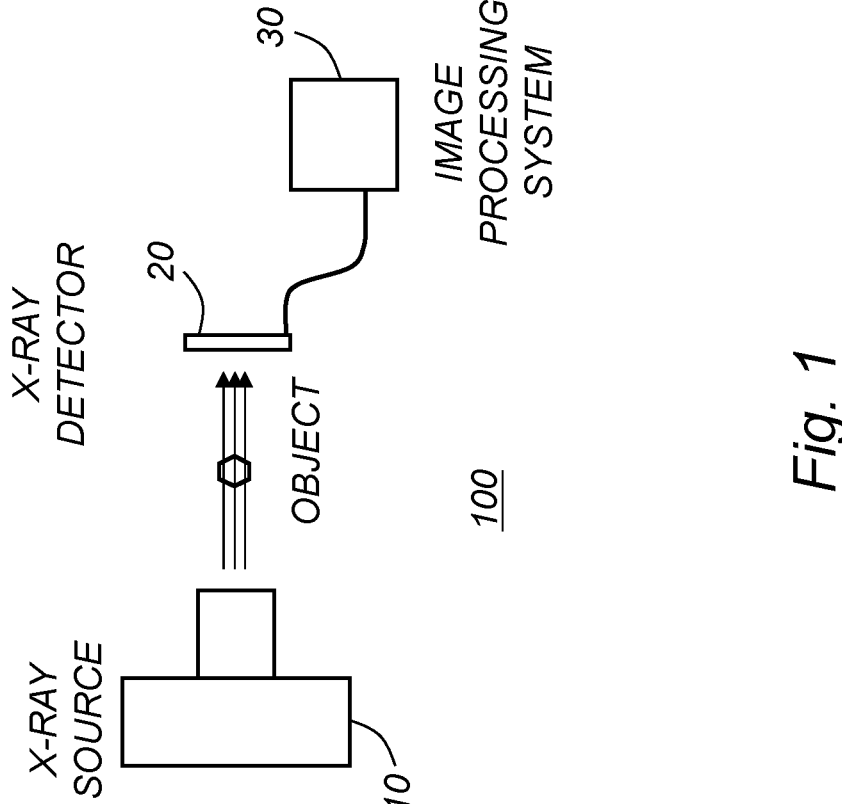
FIG. 1 is a schematic diagram illustrating an example of an overall x-ray imaging system.

In an embodiment, the computer 50 also performs post-processing and image reconstruction of the image data output from the x-ray detector. The computer thereby corresponds to the image processing system 30 as shown in FIGS. 1 and 2. The associated display allows the operator to observe the reconstructed images and other data from the computer.

The x-ray source 10 arranged in the gantry 11 emits x-rays. An x-ray detector 20, e.g. in the form of a photon-counting detector, detects the x-rays after they have passed through the patient. The x-ray detector 20 may for example be formed by plurality of pixels, also referred to as sensors or detector elements, and associated processing circuitry, such as ASICs, arranged in detector modules. A portion of the analog processing part may be implemented in the pixels, whereas any remaining processing part is implemented in, for instance, the ASICs. In an embodiment, the processing circuitry (ASICs) digitizes the analog signals from the pixels. The processing circuitry (ASICs) may also comprise a digital processing part, which may carry out further processing operations on the measured data, such as applying corrections, storing it temporarily, and/or filtering. During a scan to acquire x-ray projection data, the gantry and the components mounted thereon rotate about an iso-center 13.

Modern x-ray detectors normally need to convert the incident x-rays into electrons, this typically takes place through the photoelectric effect or through Compton inter-action and the resulting electrons are usually creating sec-ondary visible light until its energy is lost and this light is in turn detected by a photo-sensitive material. There are also detectors, which are based on semiconductors and in this case the electrons created by the x-ray are creating electric charge in terms of electron-hole pairs which are collected through an applied electric field.

There are detectors operating in an energy integrating mode in the sense that they provide an integrated signal from a multitude of x-rays. The output signal is proportional to the total energy deposited by the detected x-rays.

X-ray detectors with photon counting and energy resolv-ing capabilities are becoming common for medical x-ray applications. The photon counting detectors have an advan-tage since in principal the energy for each x-ray can be measured which yields additional information about the composition of the object. This information can be used to increase the image quality and/or to decrease the radiation dose.

Generally, a photon-counting x-ray detector determines the energy of a photon by comparing the height of the electric pulse generated by a photon interaction in the detector material to a set of comparator voltages. These comparator voltages are also referred to as energy thresh-olds. Generally, the analog voltage in a comparator is set by a digital-to-analog converter, DAC. The DAC converts a digital setting sent by a controller to an analog voltage with respect to which the heights of the photon pulses can be compared.

A photon-counting detector counts the number of photons that have interacted in the detector during a measurement time. A new photon is generally identified by the fact that the height of the electric pulse exceeds the comparator voltage of at least one comparator. When a photon is identified, the event is stored by incrementing a digital counter associated with the channel.

When using several different threshold values, a so-called energy-discriminating photon-counting detector is obtained, in which the detected photons can be sorted into energy bins corresponding to the various threshold values. Sometimes, this type of photon-counting detector is also referred to as a multi-bin detector. In general, the energy information allows for new kinds of images to be created, where new informa-tion is available and image artifacts inherent to conventional technology can be removed. In other words, for an energy-discriminating photon-counting detector, the pulse heights are compared to a number of programmable thresholds (T1-TN) in the comparators and are classified according to pulse-height, which in turn is proportional to energy. In other words, a photon counting detector comprising more than one comparator is here referred to as a multi-bin photon counting detector. In the case of multi-bin photon counting detector, the photon counts are stored in a set of counters, typically one for each energy threshold. For example, counters can be assigned to correspond to the highest energy threshold that the photon pulse has exceeded. In another example, counters keep track of the number of times that the photon pulse cross each energy threshold.

As an example, edge-on is a special, non-limiting design for a photon-counting detector, where the x-ray sensors such as x-ray detector elements or pixels are oriented edge-on to incoming x-rays.

For example, such photon-counting detectors may have pixels in at least two directions, wherein one of the direc-tions of the edge-on photon-counting detector has a com-ponent in the direction of the x-rays. Such an edge-on photon-counting detector is sometimes referred to as a depth-segmented photon-counting detector, having two or more depth segments of pixels in the direction of the incoming x-rays.

Alternatively, the pixels may be arranged as an array (non-depth-segmented) in a direction substantially orthogo-nal to the direction of the incident x-rays, and each of the pixels may be oriented edge-on to the incident x-rays. In other words, the photon-counting detector may be non-depth-segmented, while still arranged edge-on to the incom-ing x-rays.

By arranging the edge-on photon-counting detector edge-on, the absorption efficiency can be increased, in which case the absorption depth can be chosen to any length, and the edge-on photon-counting detector can still be fully depleted without going to very high voltages.

A conventional mechanism to detect x-ray photons through a direct semiconductor detector basically works as follows. The energy of the x-ray interactions in the detector material are converted to electron-hole pairs inside the semiconductor detector, where the number of electron-hole pairs is generally proportional to the photon energy. The electrons and holes are drifted towards the detector elec-trodes and backside (or vice versa). During this drift, the electrons and holes induce an electrical current in the electrode, a current which may be measured.

Figure 4:
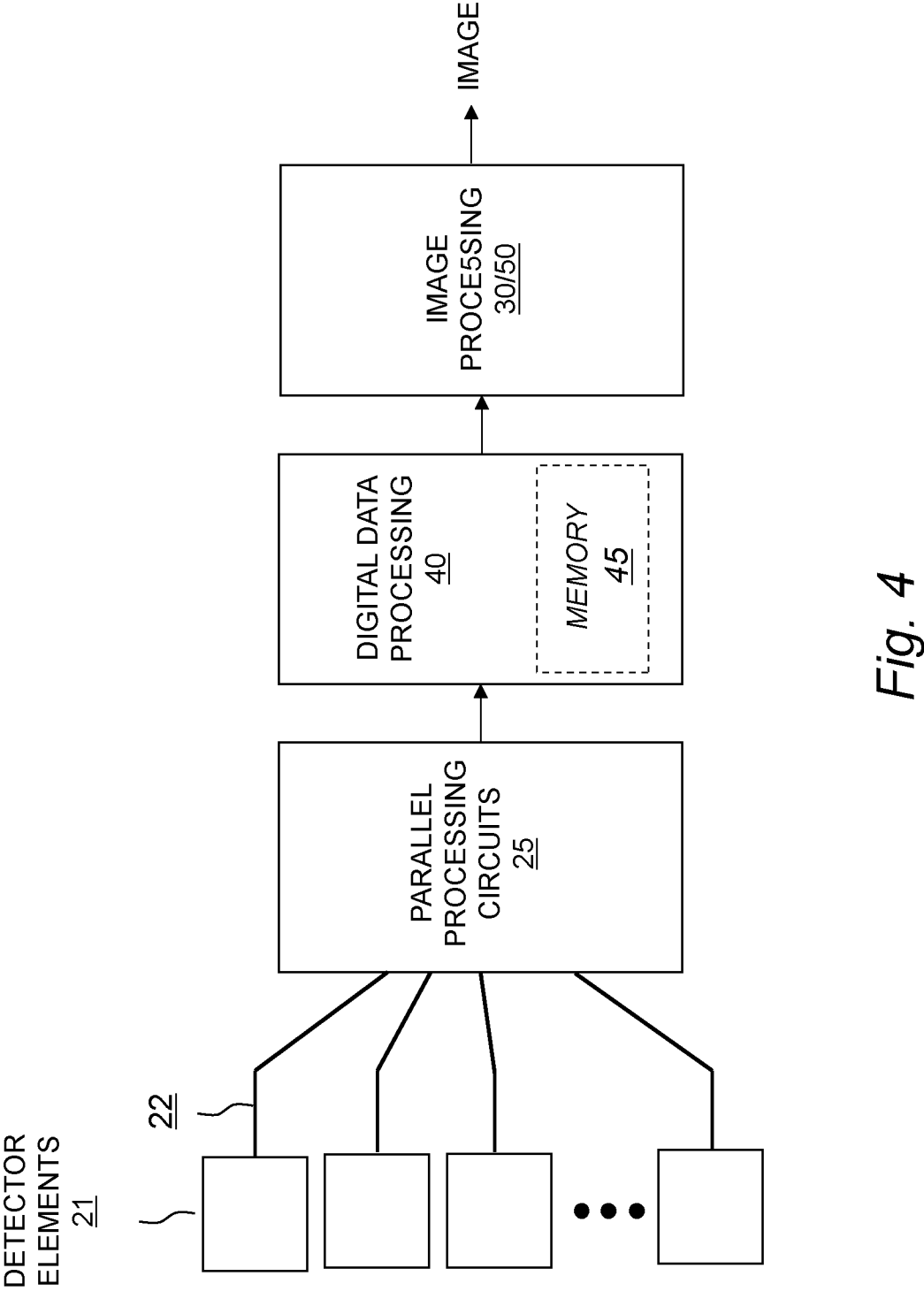
FIG. 4 is a schematic diagram illustrating another example of relevant parts of an x-ray imaging system.

As illustrated in FIG. 4, signal(s) is/are routed 22 from detector elements 21 of the x-ray detector to inputs of parallel processing circuits (e.g. ASICs) 25. It should be understood that the term Application Specific Integrated Circuit (ASIC) is to be interpreted broadly as any general circuit used and configured for a specific application. The ASIC processes the electric charge generated from each x-ray and converts it to digital data, which can be used to obtain measurement data such as a photon count and/or estimated energy. The ASICs are configured for connection to digital data processing circuitry so the digital data may be sent to further digital data processing 40 and/or one or more memories 45 and finally the data will be the input for image processing 30; 50 to generate a reconstructed image.

As the number of electrons and holes from one x-ray event is proportional to the energy of the x-ray photon, the total charge in one induced current pulse is proportional to this energy. After a filtering step in the ASIC, the pulse amplitude is proportional to the total charge in the current pulse, and therefore proportional to the x-ray energy. The pulse amplitude can then be measured by comparing its value with one or several thresholds (THR) in one or more comparators (COMP), and counters are introduced by which the number of cases when a pulse is larger than the threshold value may be recorded. In this way it is possible to count and/or record the number of x-ray photons with an energy exceeding an energy corresponding to respective threshold value (THR) which has been detected within a certain time frame.

The ASIC typically samples the analog photon pulse once every Clock Cycle and registers the output of the comparators. The comparator(s) (threshold) outputs a one or a zero depending on whether the analog signal was above or below the comparator voltage. The available information at each sample is, for example, a one or a zero for each comparator representing weather the comparator has been triggered (photon pulse was higher than the threshold) or not.

In a photon counting detector, there is typically a Photon Counting Logic which determines if a new photon has been registered and, registers the photons in counter(s). In the case of a multi-bin photon counting detector, there are typically several counters, for example one for each comparator, and the photon counts are registered in the counters in accordance with an estimate of the photon energy. The logic can be implemented in several different ways. Two of the most common categories of Photon Counting Logics are the so-called non-paralyzable counting modes, and the paralyzable counting modes. Other photon-counting logics include, for example, local maxima detection, which counts, and possibly also registers the pulse height of, detected local maxima in the voltage pulse.

There are many benefits of photon-counting detectors including, but not limited to: high spatial resolution; low electronic noise; energy resolution; and material separation capability (spectral imaging ability). However, energy integrating detectors have the advantage of high count-rate tolerance. The count-rate tolerance comes from the fact/ recognition that, since the total energy of the photons is measured, adding one additional photon will always increase the output signal (within reasonable limits), regardless of the amount of photons that are currently being registered by the detector. This advantage is one of the main reasons that energy integrating detectors are the standard for medical CT today.

Figure 5:
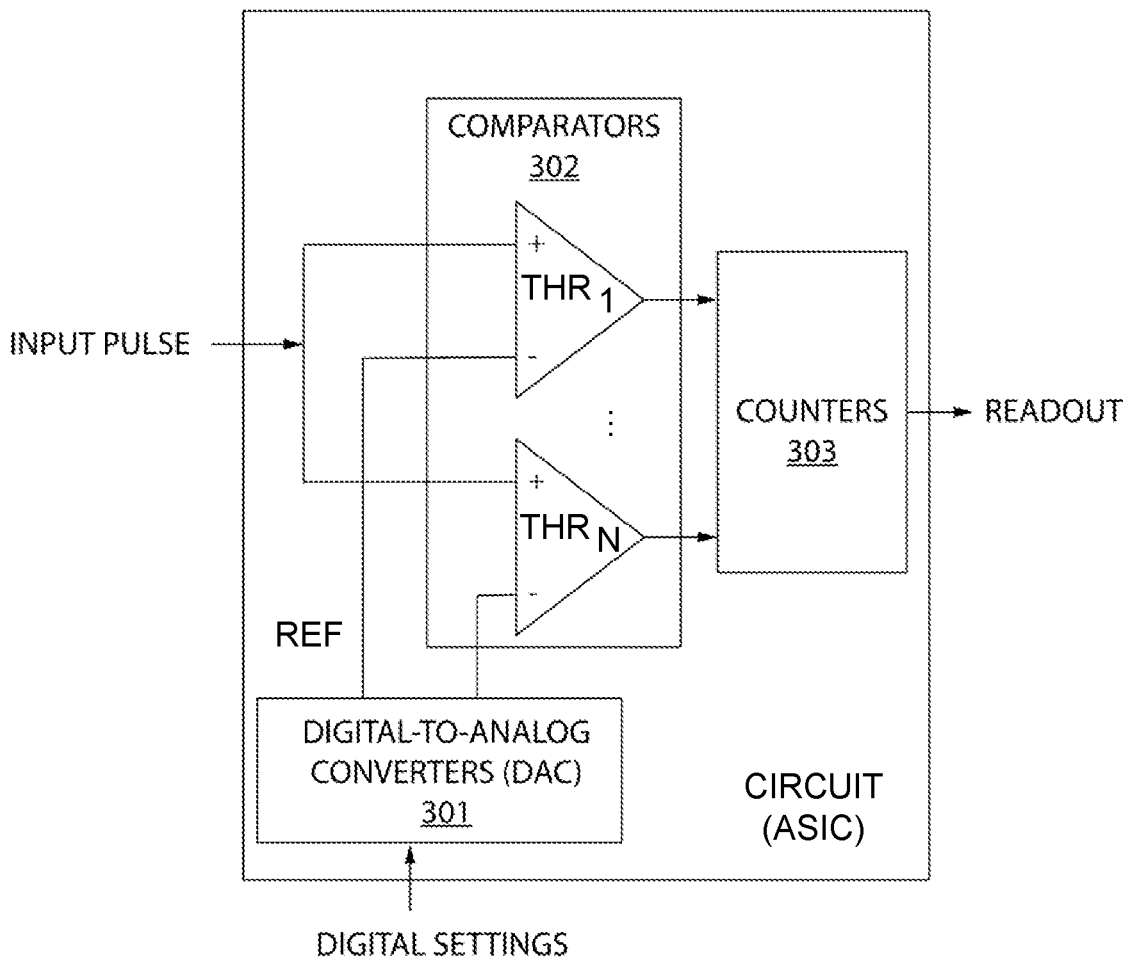
FIG. 5 is a schematic illustration of a photon-counting circuit and/or device according to prior art.

For a better understanding of the proposed measurement method, it may be useful to begin with a brief system overview and/or analysis of the technical problem. To this end, reference is made to FIG. 5, which provides a schematic illustration of a photon-counting circuit and/or device according to prior art.

When a photon interacts in a semiconductor material, a cloud of electron-hole pairs is created. By applying an electric field over the detector material, the charge carriers are collected by electrodes attached to the detector material. The signal is routed from the detector elements to inputs of parallel processing circuits, e.g. ASICs. It should be understood that the term Application Specific Integrated Circuit, ASIC, is to be interpreted broadly as any general circuit used and configured for a specific application. The ASIC processes the electric charge generated from each x-ray and converts it to digital data, which can be used to obtain measurement data such as a photon count and/or estimated energy. In one example, the ASIC can process the electric charge such that a voltage pulse is produced with maximum height proportional to the amount of energy deposited by the photon in the detector material.

The ASIC may include a set of comparators 302 where each comparator 302 compares the magnitude of the voltage pulse to a reference voltage. The comparator output is typically zero or one (0/1) depending on which of the two compared voltages that is larger. Here we will assume that the comparator output is one (1) if the voltage pulse is higher than the reference voltage, and zero (0) if the reference voltage is higher than the voltage pulse. Digital-to-analog converters, DAC, 301 can be used to convert digital settings, which may be supplied by the user or a control program, to reference voltages that can be used by the comparators 302. If the height of the voltage pulse exceeds the reference voltage of a specific comparator, we will refer to the comparator as triggered. Each comparator is generally associated with a digital counter 303, which is incremented based on the comparator output in accordance with the photon counting logic.

In general, basis material decomposition utilizes the fact that all substances built up from elements with low atomic number, such as human tissue, have linear attenuation coefficients $\mu(E)$ whose energy dependence can be expressed, to a good approximation, as a linear combination of two (or more) basis functions:

$$\mu(E) = a_1 f_1(E) + a_2 f_2(E). \qquad \text{Equation 1}$$

where $f_i$ are the basis functions and $a_i$ are the corresponding basis coefficients. If there is one or more element in the imaged volume with high atomic number, high enough for a k-absorption edge to be present in the energy range used for the imaging, one basis function must be added for each such element. In the field of medical imaging, such k-edge elements can typically be iodine or gadolinium, substances that are used as contrast agents.

As previously mentioned, the line integral $A_i$ of each of the basis coefficients $a_i$ is inferred from the measured data in each projection ray $\ell$ from the source to a detector element. The line integral $A_i$ can be expressed as:

$$A_i = \int_\ell a_i dl \text{ for } i = 1, \ldots, N, \qquad \text{Equation 2}$$

where N is the number of basis functions. In one implementation, basis material decomposition is accomplished by first expressing the expected registered number of counts in each energy bin as a function of A. Typically, such a function may take the form:

$$\lambda_i = \int_{E=0}^{\infty} S_i(E) \exp\left(-\sum_{j=1}^{N} A_j f_j(E)\right) dE \qquad \text{Equation 3}$$

Here, is the expected number of counts in energy bin i, E is the energy, $S_i$ is a response function which depends on the spectrum shape incident on the imaged object, the quantum efficiency of the detector and the sensitivity of energy bin i to x-rays with energy E. Even though the term "energy bin" is most commonly used for photon-counting detectors, this formula can also describe other energy resolving x-ray systems such as multi-layer detectors or kVp switching sources.

Then, the maximum likelihood method may be used to estimate $A_i$ under the assumption that the number of counts in each bin is a Poisson distributed random variable. This is accomplished by minimizing the negative log-likelihood function, see Roessl and Proksa, K-edge imaging in x-ray computed tomography using multi-bin photon counting detectors, Phys. Med. Biol. 52 (2007), 4679-4696:

$$\hat{A}_1, \dots ,$$

$$\hat{A}_N = \arg \min_{A_1, \dots ,A_N} \sum_{i=1}^{M_b} \lambda_i(A_1, \dots , A_N) - m_i \ln \lambda_i(A_1, \dots , A_N) \quad \text{Equation 4}$$

where $m_i$ is the number of measured counts in energy bin i and $M_b$ is the number of energy bins.

From the line integrals A, a tomographic reconstruction to obtain the basis coefficients $a_i$ may be performed. This procedural step may be regarded as a separate tomographic reconstruction or may alternatively be seen as part of the overall basis decomposition.

As previously mentioned, when the resulting estimated basis coefficient line integral $\hat{A}_i$ for each projection line is arranged into an image matrix, the result is a material specific projection image, also called a basis image, for each basis i. This basis image can either be viewed directly (e.g. in projection x-ray imaging) or taken as input to a reconstruction algorithm to form maps of basis coefficients $a_i$ inside the object (e.g. in CT). Anyway, the result of a basis decomposition can be regarded as one or more basis image representations, such as the basis coefficient line integrals or the basis coefficients themselves.

Figure 6:
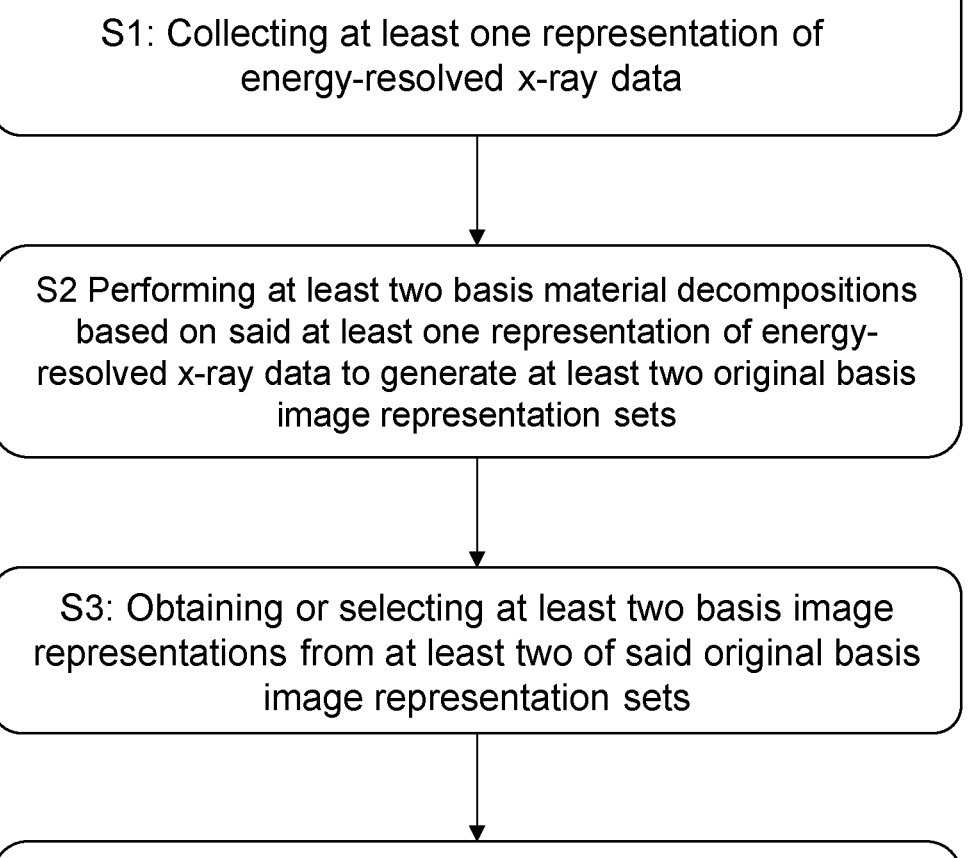
FIG. 6 is a schematic flow diagram illustrating an example of a method of image reconstruction based on energy-resolved x-ray measurement data according to an embodiment.

The proposed technology aims at significantly improving image reconstruction by using the resulting basis image representations from two or more basis material decompositions as input to machine learning-based data processing. The technical solution provided by the proposed technology may, by way of example, reduce bias, artifacts and/or noise in the output images and corresponding image representations FIG. 6 is a schematic flow diagram illustrating an example of a method of image reconstruction based on energy-resolved x-ray measurement data according to an embodiment.

Basically, the method comprises:

S1: collecting at least one representation of energy-resolved x-ray data,

S2: performing at least two basis material decompositions based on said at least one representation of energy-resolved x-ray data to generate at least two original basis image representation sets, S3: obtaining or selecting at least two basis image representations from at least two of said original basis image representation sets, and S4: processing said obtained or selected basis image representations by data processing based on machine learning to generate at least one representation of output image data.

By way of example, the data processing based on machine learning may be configured to map the obtained or selected basis image representations to said at least one representation of output image data.

In a particular example, the data processing based on machine learning may be configured to map the obtained or selected basis image representations to said at least one representation of output image data by means of a trained neural network, support vector machine or decision-tree based implementation.

For example, the trained neural network, support vector machine or decision-tree based implementation may be trained on at least one of measured patient image data or phantom image data, or/and from simulated image data based on numerical phantoms.

Optionally, the neural network, support vector machine or decision-tree based implementation may be trained on a first type of images, and adapted for use on a second type of images using transfer learning.

As an example, the neural network, support vector machine or decision-tree based implementation may be on non-energy-resolved CT images, and adapted for use on energy-resolved photon-counting CT images using transfer learning.

Typically, said at least one representation of energy-resolved x-ray data may originate from an x-ray detector or an intermediate storage and may include energy-resolved x-ray image data and/or energy-resolved x-ray measurement data.

For example, the x-ray detector may be an energy-resolving photon-counting detector, also referred to as a multi-bin photon-counting x-ray detector.

Alternatively, the energy-resolved x-ray data may be obtained from multi-x-ray-tube acquisition, slow or fast kV-switching acquisition, a multi-layer detector or by split-filter acquisition.

Figure 7:
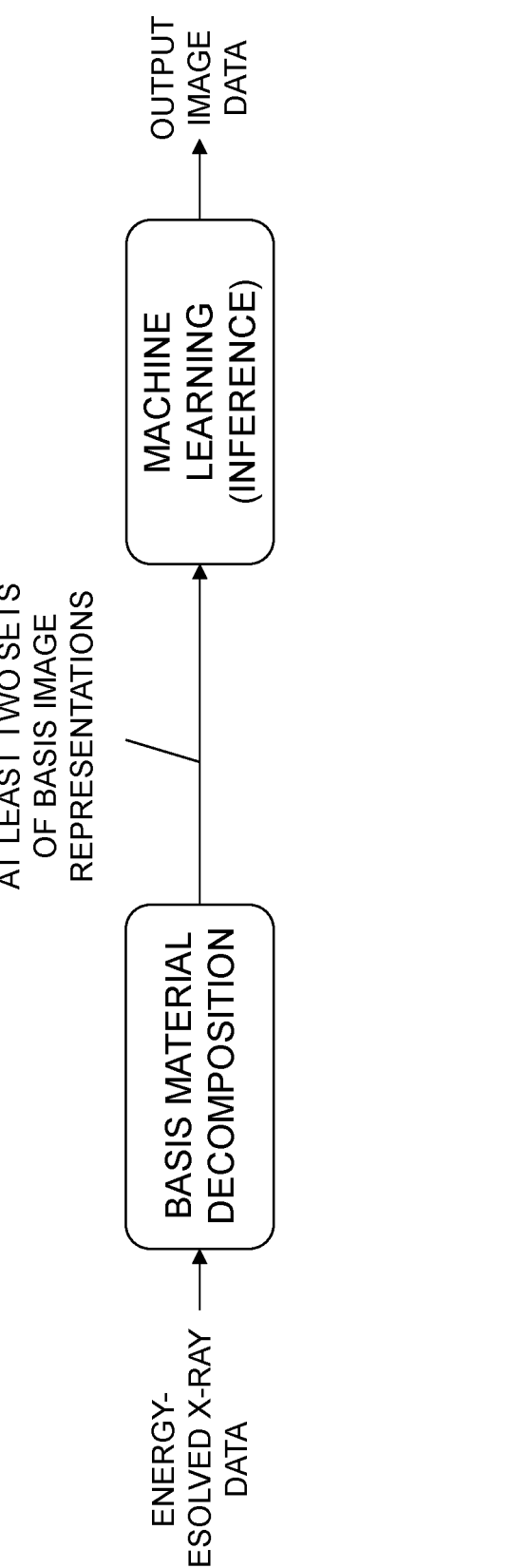
FIG. 7 is a schematic diagram illustrating an example of a complementary representation of the machine-learning based image reconstruction according to an embodiment.

FIG. 7 is a schematic diagram illustrating an example of a complementary representation of the machine-learning based image reconstruction according to an embodiment. Basically, energy-resolved x-ray data is provided as input to basis material decomposition to generate at least two sets of basis image representations, a least a subset of which are forwarded to a machine learning process and/or system. The machine learning process and/or system, when properly trained, maps the basis image representations to a output image data (normally by a process referred to as inference).

In a particular example, said at least one representation of output image data comprises a set of basis image representations, referred to as an output set of basis image representations, where the number of basis image representations in the output set is larger than the maximum number of basis image representations in any of said at least two original basis image representation sets.

By way of example, the output set of basis image representations may have a number of basis functions, and each original basis image representation set may have a respective number of basis functions, and the basis functions corresponding to the output set of basis image representations may be a subset of, or equal to, the union of the basis functions corresponding to said at least two original basis image representation sets.

For example, the output set of basis image representations has a number of basis functions, and each original basis image representation set has a respective number of basis functions, and the number of said obtained or selected basis image representations is equal to or greater than the number of basis functions corresponding to said output set of basis image representations.

In a particular example, the original basis image representation sets are based on two-basis decompositions, and the output set of basis image representations is based on a three-basis decomposition.

For such a case, the data processing based on machine learning may be performed, e.g. by a neural network, and the neural network may be trained with several two-basis image representation sets as input data and three-basis image representation sets as output data.

As an example, the two-basis image representation sets and three-basis image representation sets may have been generated from measured patient image data or phantom image data, or from simulated image data based on numerical phantoms.

Optionally, the step of processing the obtained or selected basis image representations may include:

combining the obtained or selected basis image representations with at least one representation of non-basis image data; and processing the obtained or selected basis image representations with said at least one representation of non-basis image data by the data processing based on machine learning.

For example, the non-basis image data may include at least one of bin counts sinogram data, log-normalized bin counts sinogram data, sum-over-bins sinogram or log-normalized data, reconstructed CT image data, and segmentation mask data.

Optionally, the step of processing the obtained or selected basis image representations may include:

combining said obtained or selected basis image representations with at least one representation of prior information, and processing said obtained or selected basis image representations with said at least one representation of prior information by said data processing based on machine learning.

Prior information is generally defined as a separate set of available information that is assumed known, e.g. based on physical laws and principles and/or previous measurements, images and/or simulations.

Optionally, the step of processing the obtained or selected basis image representations may include:

combining the obtained or selected basis image representations with at least one computational representation of a physical process in an acquisition system, and processing the obtained or selected basis image representations with said at least one computational representation of a physical process by the data processing based on machine learning.

Optionally, the step of processing the obtained or selected basis image representations may include:

combining the obtained or selected basis image representations with at least one computational representation of a statistical model for the measured data, and processing the obtained or selected basis image representations with said at least one computational representation of a statistical model by the data processing based on machine learning.

In a particular example, said at least one representation of output image data includes an output set of basis image representations and/or material-decomposition reconstructed images.

As an example, the data processing based on machine learning may include deep learning post-processing, configured based on training data and the deep learning post-processing may be configured to receive biased material-decomposed sinograms as input and provide de-biased material-decomposed sinograms or debiased material-decomposition reconstructed images as output.

By way of example, a set of sinograms may be provided as input for two-basis decomposition to generate two or more basis image representations, and a deep learning neural network may be used to transform the resulting basis image representations into a three-material decomposition.

According to a second aspect, there is provided a system for image reconstruction based on energy-resolved x-ray data. The system is configured to obtain at least one representation of energy-resolved x-ray data. The system is configured to perform at least two basis material decompositions based on said at least one representation of energy-resolved x-ray data to generate at least two sets of basis image representations. The system is further configured to obtain or select at least two basis image representations from at least two of said sets of basis image representation. The system is also configured to process said obtained or selected basis image representations by data processing based on a machine learning system to generate at least one representation of output image data.

According to a third aspect, there is provided a system for image reconstruction based on energy-resolved x-ray data. The system comprises:

an input for receiving at least one representation of energy-resolved x-ray data;

a basis material decomposition system configured to perform at least two basis material decompositions based on said at least one representation of energy-resolved x-ray data to generate at least two sets of basis image representations;

a trained machine learning system having a configuration determined based on input-output-paired training data and adapted to receive at least two basis image representations from at least two of said sets of basis image representation and process the received basis image representations by machine learning-based data processing to generate at least one representation of output image data; and an output for outputting said at least one representation of output image data.

Figure 8:
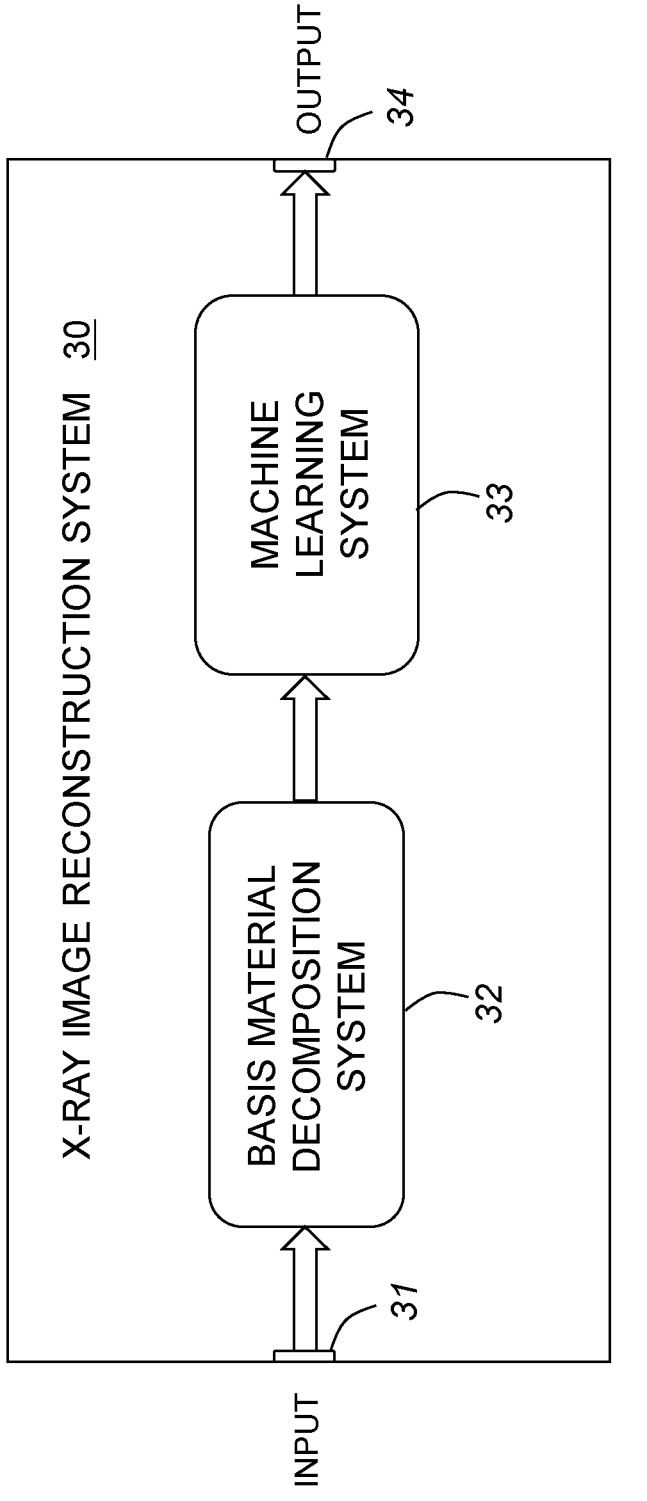
FIG. 8 is a schematic block diagram illustrating an example of an x-ray image reconstruction system according to an embodiment.

FIG. 8 is a schematic block diagram illustrating an example of an x-ray image reconstruction system according to an embodiment. The x-ray image reconstruction system 30 of FIG. 8 basically comprises an input 31, a basis material decomposition system 32, a machine learning system 33 and an output 34.

As mentioned, the machine learning system 33 may be based, e.g. on a neural network, a support vector machine or a decision-tree based implementation.

By way of example, the machine learning system 33 may be trained on at least one of measured patient image data or phantom image data, or from simulated image data based on numerical phantoms.

In a particular example, the machine learning system 33 is trained on a first type of images, and adapted for use on a second type of images using transfer learning.

For example, the machine learning system 33 may be trained on non-energy-resolved CT images, and adapted for use on energy-resolved photon-counting CT images using transfer learning.

In a particular example, the machine learning system 33 is configured to map the obtained or selected basis image representations to said at least one representation of output image data.

Typically, said at least one representation of energy-resolved x-ray data may originate from an x-ray detector or an intermediate storage and may include energy-resolved x-ray image data and/or energy-resolved x-ray measurement data.

By way of example, the x-ray detector may be an energy-resolving photon-counting detector, also referred to as a multi-bin photon-counting x-ray detector.

As mentioned, said at least one representation of output image data may comprise a set of basis image representations, referred to as an output set of basis image representations, where the number of basis image representations in the output set is larger than the maximum number of basis image representations in any of said at least two original basis image representation sets.

For example, the output set of basis image representations has a number of basis functions, and each original basis image representation set has a respective number of basis functions, and the basis functions corresponding to the output set of basis image representations is a subset of, or equal to, the union of the basis functions corresponding to said at least two original basis image representation sets.

For example, said at least one representation of output image data may include an output set of basis image representations and/or material-decomposition reconstructed images.

In a particular example, the image reconstruction system comprises at least one processor and memory, the memory comprising instructions, which when executed by the at least one processor, cause the at least one processor to perform image reconstruction.

By way of example, the basis material decomposition system may comprise processing circuitry configured to generate at least two sets of basis image representations, and the trained machine learning system may comprise processing circuitry configured to generate at least one representation of output image data For a better understanding, the proposed technology will now be described with reference to non-limiting examples with respect to image reconstruction using resulting basis image representations from two or more basis decompositions as input to a machine learnings process and/or system.

Within the field of x-ray imaging, a representation of image data may comprise for example a sinogram, a projection image or a reconstructed CT image. Such a representation of image data may be energy-resolved if it comprises a plurality of channels where the data in different channels is related to measured x-ray data in different energy intervals.

Through a process of material decomposition taking a representation of energy-resolved x-ray data as input, a basis image representation set may be generated. Such a set is a collection of a number of basis image representations, where each basis image representation is related to the contribution of a particular basis function to the total x-ray attenuation. Such a set of basis image representations may be a set of basis sinograms, a set of reconstructed basis CT images or a set of projection images. It will be understood that "image" in this context can mean for example a two-dimensional image, a three-dimensional image or a time-resolved image series.

By way of example, energy-resolved x-ray data may be energy-resolved x-ray image data and/or energy-resolved x-ray measurement data. As an example, at least one representation of energy-resolved x-ray data may originate from an x-ray detector or an intermediate storage.

For example, a representation of energy-resolved x-ray data can comprise a collection of energy bin sinograms, where each energy sinogram contains the number of counts measured in one energy bin. By taking this collection of energy bin sinograms as input to a material decomposition algorithm, a set of basis sinograms can be generated. Such basis sinograms may exemplarily be taken as input to a reconstruction algorithm to generate reconstructed basis images.

In a two-basis decomposition, two basis image representations are generated, based on an approximation that the attenuation of any material in the imaged object can be expressed as the linear combination of two basis functions.

In a three-basis decomposition, three basis image representations are generated, based on an approximation that the attenuation of any material in the imaged object can be expressed as the linear combination on three basis images. Similarly, a four-basis decomposition, a five-basis decomposition and similar multi-basis decomposition can be defined. It is also possible to perform a one-basis decomposition, by approximating all materials in the image object as having x-ray attenuation coefficients with similar energy-dependence up to a density scale factor.

A two-basis decomposition may for example result in a set of basis sinograms comprising a water sinogram and an iodine sinogram, corresponding to basis functions given by the linear attenuation coefficients of water and iodine, respectively. Alternatively, the basis functions may represent the attenuation of water and calcium; or calcium and iodine; or polyvinyl chloride and polyethylene. A two-basis decomposition may for example result in a set of basis sinograms comprising a water sinogram, a calcium sinogram and an iodine sinogram. Alternatively, the basis functions may represent the attenuation of water, iodine and gadolinium; or polyvinyl chloride, polyethylene and iodine.

The inventors have appreciated that an accurate basis decomposition with more than two basis functions may be hard to perform in practice, and may result in artifacts, bias or excessive noise. Such a basis decomposition may also require extensive calibration measurements and data preprocessing to yield accurate results. In general, a basis decomposition into a larger number of basis functions may be more technically challenging than decomposition into a smaller number of basis functions.

For example, it may be difficult to perform a calibration that is accurate enough to give a three-basis decomposition with low levels of image bias or artifacts, compared to a two-basis decomposition. Also, it may be difficult to find a material decomposition algorithm that is able to perform three-basis decomposition with highly noisy data without generating excessively noisy basis images, i.e. it may be difficult to attain the theoretical lower limit on basis image noise given by the Cramer-Rao lower bound, while this bound may be easier to attain when performing two-basis decomposition.

The inventors have further appreciated that the amount of information needed to generate a larger number of basis image representations may be possible to extract from several sets of basis image representations, each with a smaller number of basis image representations. For example, the information needed to generate a three-basis decomposition into water, calcium and iodine sinograms may be possible to extract from a set of three two-basis decompositions: a water-calcium decomposition, a water-iodine decomposition and a calcium-iodine decomposition.

It may be easier to perform several two-basis decompositions accurately than a performing a single three-basis decomposition accurately. In a particular example of the disclosed invention, this observation may be used to solve the problem of, e.g., performing an accurate three-basis decomposition. By way of example, energy-resolved image data may first be used to perform a water-calcium decomposition, a water-iodine decomposition and a calcium-iodine decomposition. Then, a machine learning system such as a convolutional neural network may be used to map the resulting six (3×2) basis images, or a subset thereof, to a set of three output images comprising water, calcium and iodine images. Such a machine learning system or network can be trained with several two-basis image representation sets as input data and three-basis image representation sets as output data, where said two-basis image representation sets and three-basis image representation sets have been generated from measured patient image data or phantom image data, or from simulated image data based on numerical phantoms.

With the aforementioned method, the bias, artifacts, or noise in the three-basis image representation set can be reduced significantly compared to a three-basis decomposition performed directly on energy-resolved image data. Alternatively, an image with higher resolution can be obtained.

Instead of a neural network, the machine learning algorithm applied to the original basis images may include another machine learning method such as a support vector machine or a decision-tree based method.

More generally, the inventors have realized that it is possible to substantially improve and facilitate the efficiency, operation and/or results of a machine learning process and/or system when performing x-ray image reconstruction. Instead of following the predominant trend of using machine learning on raw image data, the inventors have realized that improved image results can be achieved when utilizing the resulting basis image representations from two or more basis material decompositions as input for the machine learning process and/or system. For example, the improvements may involve reduced bias, artifacts and/or noise, or higher resolution. Another advantage is that the proposed technology reduces the amount of training data required for obtaining image reconstruction with high reliability and quality.

The basis material decomposition used to generate the original basis image representations may use and/or involve prior information, such as for example volume or mass preservation constraints or nonnegativity constraints. Alternatively, such prior information may take the form of a prior image representation, for example an image from a previous examination or an image reconstructed from aggregate counts in all energy bins, and the algorithm may penalize deviations of the decomposed basis image representation relative to this prior image representation. Another alternative is to use prior information learned from a set of training images, represented for example as a learned dictionary or a pre-trained convolutional neural network, or a learned subspace, i.e. a subspace of the vector space of possible images, that the reconstructed image is expected to reside in.

A material decomposition may for example be carried out on projection image data or sinogram data by processing each measured projection ray independently. This processing may take the form of a maximum likelihood decomposition, or a maximum a posteriori decomposition where a prior probability distribution on the material composition in the imaged object is assumed. It may also take the form of linear or affine transform from the set of input counts to the set of output counts, an A-table estimator as exemplarily described by Alvarez (Med Phys. 2011 May; 38(5): 2324-2334), a low-order polynomial approximation e.g. as exemplarily described by Lee et al. (IEEE Transactions on Medical Imaging (Volume: 36, Issue: 2, February 2017: 560-573), a neural network estimator as exemplarily described by Alvarez (https://arxiv.org/abs/1702.01006) or a look-up table. Alternatively, a material decomposition method may process several rays jointly, or comprise a one-step or two-step reconstruction algorithm.

WO2017/223560 discloses a tomographic image reconstruction method where a deep-learning algorithm is used to generate a reconstructed image, for example by first applying a first algorithm to obtain intermediate data and then applying a second algorithm to the intermediate image.

U.S. Pat. No. 9,036,885 discloses a projection-domain denoising processing method which processes projection data with a sparsifying transform and shrinkage, for example with a learned shrinkage function.

WO2015/028975 discloses a method for receiving at least two basis material sinograms and denoising the basis material sinograms with a decorrelation filter.

An article by Chen and Li in Optical Engineering 58(1), 013104 discloses a method for performing multi-material decomposition of spectral CT data using deep neural networks, merely performing the actual material decomposition by the neural network.

An article by Poirot et al. in Scientific Reports volume 9, Article number: 17709 (2019) discloses a method of generating non-contrast single-energy CT images from dual-energy CT images using a convolutional neural network.

According to a first aspect, there is provided a non-limiting example of a method for processing of energy-resolved x-ray data is provided, comprising the steps of:

collecting at least one representation of energy-resolved x-ray data, performing at least two basis material decompositions on said at least one representation of energy-resolved x-ray data, resulting in at least two original basis image representation sets, obtaining or selecting at least two basis image representations from at least two of said original basis image representation sets, and processing said obtained or selected basis image representations with data processing (such as a data processing procedure) based on a machine learning algorithm to generate at least one representation of output image data.

In other words, this can be expressed as a method of (x-ray) image reconstruction based on energy-resolved x-ray data.

According to a second aspect, there is provided a non-limiting example of a corresponding system for processing energy-resolved x-ray data is also provided, with the following configuration:

wherein the system is configured to collect at least one representation of energy-resolved x-ray data, wherein the system is configured to perform at least two basis material decompositions on said representation of image data to generate at least two original basis image representation sets, wherein the system is configured to obtain or select at least two basis image representations from at least two of said original basis image representation sets, and wherein the system is configured to process said obtained or selected basis image representations using data processing (such as a data processing procedure) based on machine learning to generate at least one representation of output image data.

In other words, this can be expressed as a system for (x-ray) image reconstruction based on energy-resolved x-ray data.

In an exemplary embodiment of the invention, said step or configuration of collecting at least one representation of energy-resolved x-ray data is done by way of a CT imaging system.

In an exemplary embodiment of the invention, said step or configuration of collecting at least one representation of energy-resolved x-ray data is done by way of an energy-resolving photon-counting detector, also referred to as a multi-bin photon-counting x-ray detector.

Alternatively, said step or configuration of collecting at least one representation of energy-resolved x-ray data is done by way of multi-x-ray-tube acquisition, slow or fast kV-switching acquisition, a multi-layer detector or split-filter acquisition.

In an exemplary embodiment of the invention, said at least one original or output basis representations comprises at least one of a sinogram, a projection x-ray image or a reconstructed CT image.

In an exemplary embodiment of the invention, said step or configuration of processing of selected basis images includes the steps or configurations of:

combining said selected basis image data with at least one representation of non-basis image data, exemplarily bin counts sinogram data, log-normalized bin counts sinogram data, sum-over-bins sinogram or log-normalized data, reconstructed CT image data, and/or segmentation mask data, and processing said selected basis image data with said representation of non-basis image data with said data processing method based on machine learning.

In an exemplary embodiment of the invention, said at least one representation of output image data is an approximation of a basis image representation forming part of a basis image set corresponding to basis functions different from the original sets of basis images.

In an exemplary embodiment of the invention, said at least one representation of output image data comprises a set of basis image representations, where the number of basis image representations in said output set is larger than the maximum number of basis images in any of the sets of basis images in the original decomposition.

In an exemplary embodiment of the invention, the basis functions corresponding to said output basis image representation set is a subset of, or equal to, the union of the basis functions corresponding to said original basis image representation sets. Alternatively, the basis functions corresponding to said output basis image representation set may not be a subset of the union of the basis functions corresponding to said original basis image representation sets.

In an exemplary embodiment of the invention, the number of said selected basis image representations is equal to or greater than the number of basis functions corresponding to said output basis image representation set.

In an exemplary embodiment of the invention, said original basis image representation set include/are two-basis decompositions, and said at least one output image representation set includes/is a three-basis decomposition.

In an exemplary embodiment of the invention, at least one of said basis material decompositions is performed through a maximum likelihood method. Alternatively, at least one of said basis material decompositions is performed through a linear or affine transformation, an A-table method, a low-order polynomial approximation, a neural network or a look-up table.

In an exemplary embodiment of the invention, at least one of said basis material decompositions is performed by way of a one-step basis image reconstruction method, or by way of a two-step basis image reconstruction method.

In an exemplary embodiment of the invention, said machine learning involves a machine-learning architecture and/or algorithm, which may be based on a convolutional neural network. Alternatively, said machine-learning architecture and/or algorithm may be based on a support vector machine or a decision-tree based method.

In an exemplary embodiment of the invention, said convolutional neural network is based on a residual network (ResNet), residual encoder-decoder, U-Net, AlexNet or LeNet architecture. Alternatively, said machine-learning algorithm based on a convolutional neural network may be based on an unrolled optimization method based on gradient descent algorithm, a primal-dual algorithm or an alternating direction method of multipliers (ADMM) algorithm.

In an exemplary embodiment of the invention, said convolutional neural network includes at least one forward projection or at least one backprojection as part of the network architecture.

In an exemplary embodiment of the invention, said convolutional neural network is trained on at least one of phantom images, patient images, or on numerical phantoms generated from patient imaged with non-energy-resolving CT.

In an exemplary embodiment of the invention, said convolutional neural network is trained using transfer learning on a first type of CT images, for example non-energy resolving CT images, and adapted for use on a second type of CT images, for example photon-counting CT images using transfer learning.

In an exemplary embodiment of the invention, said step or configuration of processing of selected basis images includes:

combining said selected basis image data with at least one representation of prior information, exemplarily such as a volume constraint on a prior image, a prior distribution represented as a learned dictionary, a regularization penalty, a learned regularization neural network, or a learned subspace, or a statistical anatomical shape model, and processing said selected basis image data with said representation of prior information with said data processing based on machine learning.

In an exemplary embodiment of the invention, said step or configuration of processing of selected basis images includes:

combining said selected basis image data with at least one computational representation of a physical process in an acquisition system, exemplarily Compton scatter, fluorescence, charge sharing, pile-up or geometric blur, and processing said selected basis image data with said computational representation of a physical process based on a machine learning algorithm.

Alternatively, said step or configuration of processing of selected basis images includes combining said selected basis image data with at least one computational representation of a statistical model for the measured data, such as a likelihood function or a derivative of a likelihood function.

In an exemplary embodiment of the invention, said machine learning architecture and/or algorithm is trained in such a way as to generate one or more output basis image representations with lower noise than the original basis image representations. Alternatively, said machine learning architecture and/or algorithm may be trained in such a way as to generate one or more output basis image representations with lower bias than the original basis image representations. In yet another alternative, said machine learning architecture and/or algorithm may be trained in such a way as to generate one or more output image data representations with higher spatial resolution than the original basis image representations.

In general, deep learning relates to machine learning methods based on artificial neural networks or similar architectures with representation learning. Learning can be supervised, semi-supervised or unsupervised. Deep learning systems such as deep neural networks, deep belief networks, recurrent neural networks and convolutional neural networks have been applied to various technical fields including computer vision, speech recognition, natural language processing, social network filtering, machine translation, and board game programs, where they have produced results comparable to and in some cases surpassing human expert performance.

The adjective "deep" in deep learning originates from the use of multiple layers in the network. Early work showed that a linear perceptron cannot be a universal classifier, and that a network with a non-polynomial activation function with one hidden layer of unbounded width can on the other hand so be. Deep learning is a modern variation which is concerned with an unlimited number of layers of bounded size, which permits practical application and optimized implementation, while retaining theoretical universality under mild conditions. In deep learning the layers are also permitted to be heterogeneous and to deviate widely from biologically informed connectionist models, for the sake of efficiency, trainability and understandability.

For a better understanding, illustrative and non-limiting examples of the proposed technology will now be described.

The material decomposition problem is a non-linear inverse problem that is difficult to solve, both in terms of computation expense and accuracy. The most accepted solution involves an optimization based on a maximum likelihood (ML) estimate with Poisson statistics, which is a model-based approach very dependent on the considered forward model. On the other hand, a data-driven approach makes use of the available measured data. This is the case of Deep Learning, that can provide prior information in a computationally fast manner.

By way of example, in Photon-Counting CT (PCCT), three materials are normally relevant for a clinical analysis. However, in practice, a two-material basis ML estimate converges better, is more stable, and less noisy than a three-material basis estimate. Nevertheless, the two-material basis estimates present high bias. A deep learning post-processing, using measured training data, can correct for the bias, maintaining the advantages of a two-material ML estimate (stability, convergence) and providing a data-driven regularization to compensate for the bias. Therefore, it is suggested to combine the advantages of two-materials basis decomposition with a data-driven approach that controls the bias.

In a particular, non-limiting example, the idea is to move from two-material decomposition to three-material decomposition. In this example, the proposed technology takes advantage of the stability and convergence of a two-material basis ML estimation and considers a data-driven post-processing to correct for the bias. By way of example, the material decomposition may be performed in the projection (sinogram) domain, i.e., the reconstruction of the CT images may be an independent second phase.

Assuming that the scanned object contains three materials, e.g. bone, soft-tissue, and a contrast agent (such as iodine), let us define a series of two-material estimates to obtain every possible combination of two basis materials, that is (i) bone and soft tissue, (ii) bone and iodine, and (iii) soft tissue and iodine. For example, a deep learning architecture and/or procedure of the proposed technology may consider this collection of six biased estimates as input to provide an unbiased estimate of bone, soft tissue, and iodine as output.

By way of example, it is feasible to use a supervised machine learning architecture and/or procedure (input-output-paired training data) that receives the biased material-decomposed sinograms (from the two-basis ML estimates) and provides three corrected material decomposed sinograms as output.

For example, the designed architecture may be a residual network that consists of 5 residual blocks (ResBlock). Each block may include three convolutional layers, followed by batch normalization and rectified linear units (ReLu) activation. In a particular example, the output channels of each convolutional layer are 32, 32 and 3, respectively.

Figure 9:
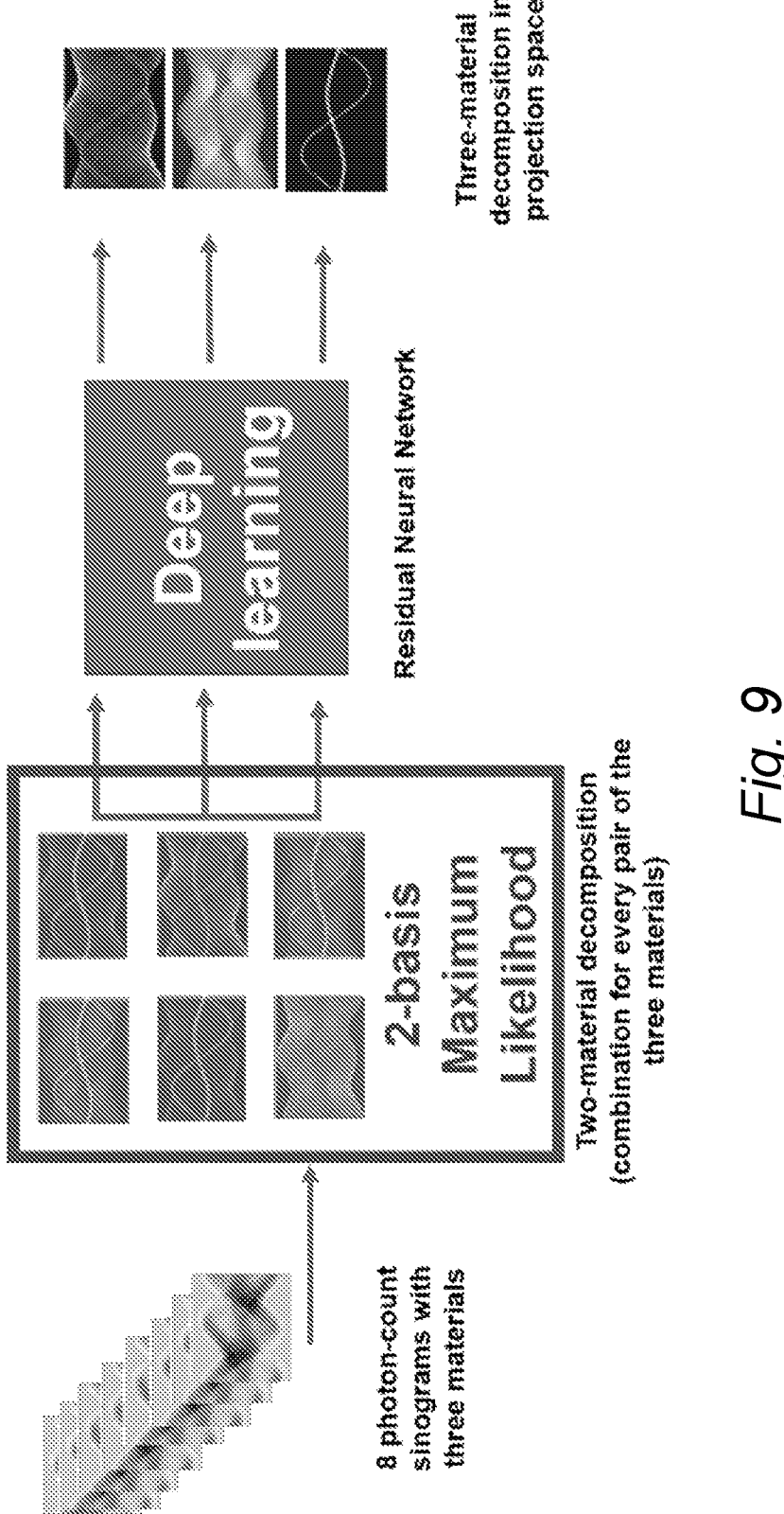
FIG. 9 is a schematic diagram illustrating an example of a scheme and/or architecture for the proposed deep learning debiasing according to an embodiment.

FIG. 9 is a schematic diagram illustrating an example of a scheme and/or architecture for the proposed deep learning debiasing. In a non-limiting example, a set of e.g. 8 sinograms may be provided as input for two-basis decomposition to generate two or more basis image representations. A deep learning neural network may be used to transform the resulting basis image representations into a three-material decomposition, e.g. in projection space.

By way of example, the ResBlocks may mimic the updates of an iterative solution to an optimization problem and add information from training data with the learned convolutional filters. Each block $\Psi$ can be considered as the n-th update step. That is, the input of the (n+1)-th block, $a_{n+1}$, is the difference between the output in the n-th block, $a_n$, and the result of the operations on the last block $\Psi_n$, parametrized by its filter weights en:

$$a_{n+1} = a_n - \Psi_{\theta_n}(a_n) \hspace{2cm} \text{Equation 5}$$

It should be understood that LP is a function of variable an and parameterized by $\theta_n$.

Figure 10:
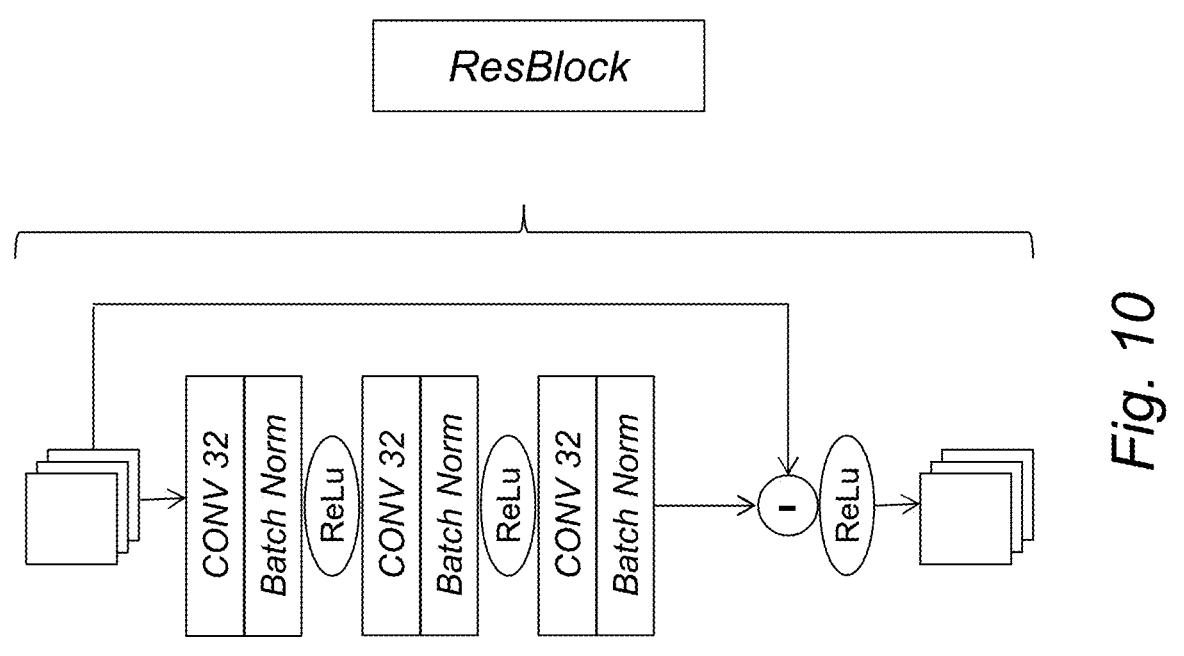

FIG. 10 is a schematic diagram illustrating an example of a ResBlock.

Figure 11:
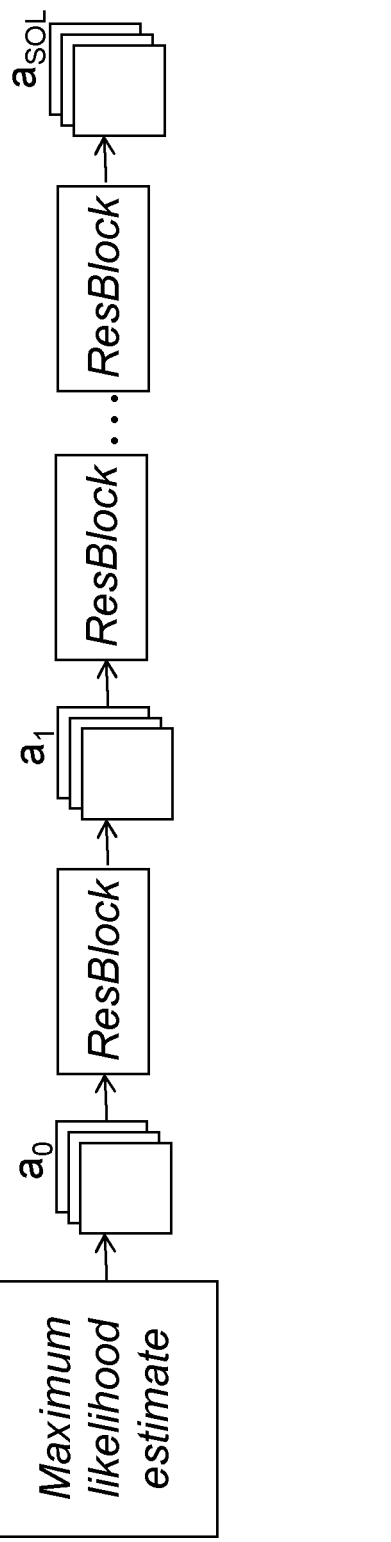
FIG. 11 is a schematic diagram illustrating an example of a debiasing deep learning scheme and/or architecture including a series of residual blocks (ResBlocks) after a biased result from two-material decompositions.

FIG. 11 is a schematic diagram illustrating an example of a debiasing deep learning scheme and/or architecture including a series of residual blocks (ResBlocks) after a biased result from two-material decompositions.

Figure 12:
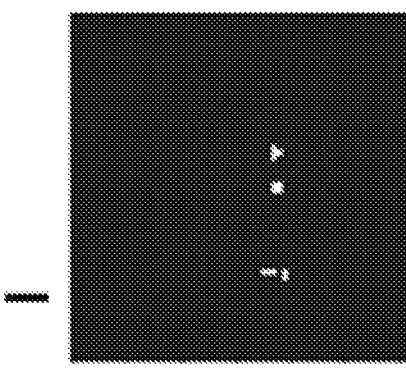
FIG. 12 is a schematic diagram illustrating an example of a sample of a simulated dataset, where different parts of the Shepp-logan phantom mimic different materials.
Figure 12:
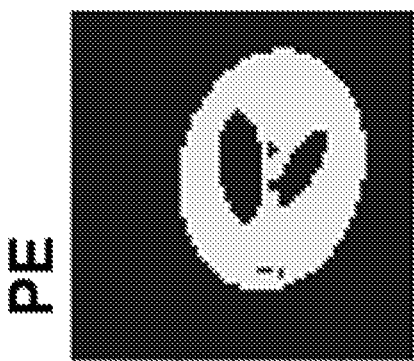
Figure 12:
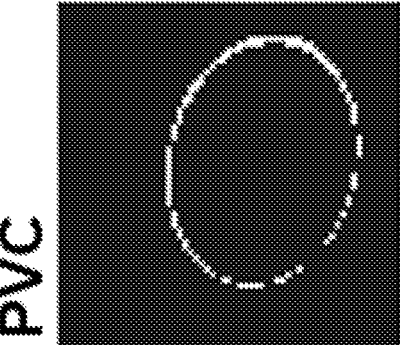

As part of the inventive activity and the research and development, we have developed a simulation-based proof-of-concept of this technique. By way of example, a feasible set-up involves:

A dataset of simulated PCCT data, based on a Shepp-Logan head. We consider a forward model of the PCCT system and Poisson noise. The size of the phantoms is 64×64 pixels in image space and 100×100 pixels in projection space. The materials considered are PVC (bone), PE (soft tissue) and iodine. To add variability to the data, we have randomly changed the size, rotation and iodine regions position of each sample. See FIG. 12, which is a schematic diagram illustrating an example of a sample of a simulated dataset, where different parts of the Shepp-logan mimic different materials.

Considering a two-material decomposition ML functional, we perform the pairs of estimates: PVC/PE, PVC/I, and PE/I. These estimates are biased because they belong to a three-material mixture.

These biased estimates are the input of the neural network. The output consists of three unbiased and denoised estimates, one per material: PVC, PE, I.

For the training of the neural network, we consider an Adam optimization scheme with mean-squared error (MSE) training loss. In this example, we use 250 samples for training and 100 for testing.

The evaluation over the 100 test samples show significant improvement over MSE and bias of the resulting projections. See Table 1 below and FIG. 13.

TABLE 1

|  | Biased two-material-based estimates | Deep learning debiased |
| --- | --- | --- |
| MSE | 0.0337 | 0.0038 |
| Bias | 0.0179 | 0.0058 |

Figure 13:
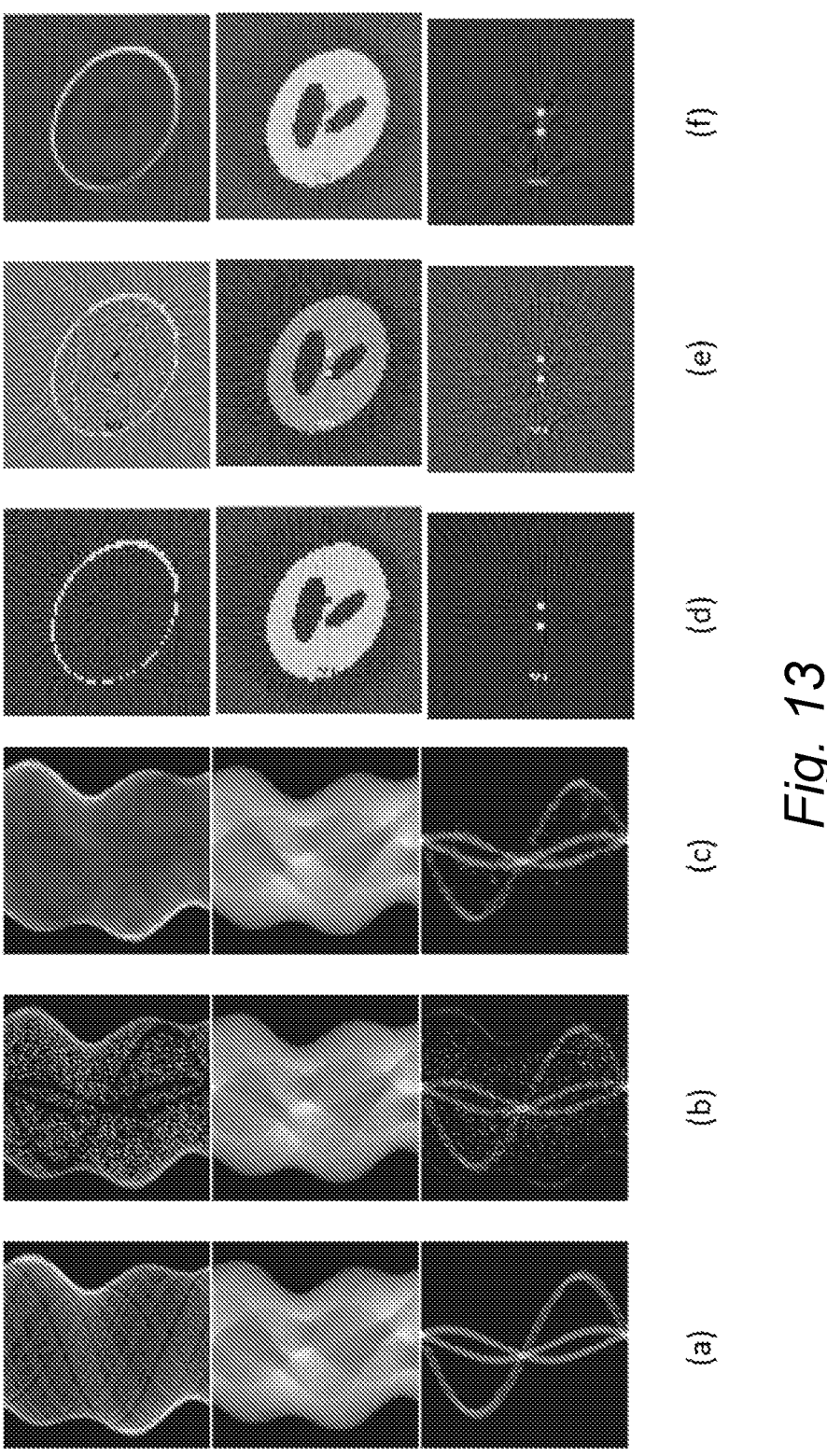
FIGS. 13(a)-(f) are schematic diagrams illustrating examples of qualitative results of a proposed deep learning-based debiasing for the Shepp-logan simulated phantom.

FIGS. 13(*a*)-(*f*) are schematic diagrams illustrating examples of qualitative results of a proposed deep learning-based debiasing for the Shepp-logan simulated phantom.

FIG. 13(*a*) shows an example of true sinograms of materials for PVC (first row), PE (second row) and iodine (third row).

FIG. 13(*b*) shows an example of the best three of the six solutions from the biased two-material ML.

FIG. 13(*c*) shows an example of proposed unbiased sinograms.

FIG. 13*d*) shows an example of true basis images after reconstruction with filtered back-projection (FBP).

FIG. 13(*e*) shows an example of biased estimates after FBP.

FIG. 13(*f*) shows an example of proposed unbiased after FBP.

In the following, possible alternative implementations of the proposed technology that could potentially enhance the results are presented, especially when the technology/method needs to be scaled to handle real clinical data:

The neural network:

a. Scale the proposed residual network: when inputs have bigger dimensions the sizes of the convolutional layers, and the number of blocks could be designed accordingly, i.e., more convolutional layers in each block, more convolutional output channels in each layer or more than 5 ResBlocks.

b. Change the network architecture: the proposed Res-Block network could be replaced by a U-net that also exploits multiscale information of the input. Reference can be made to, e.g., "U-Net: Convolutional Networks for Biomedical Image Segmentation" by O. Ronneberger et al., Medical Image Computing and Computer-Assisted Intervention— MICCAI (2015). Alternatively, the proposed network could be replaced by another common network architecture, exemplarily AlexNet or LeNet, which combine convolutional and fully-connected layers.

c. Enhance the neural network architecture: consider convolutional filters that are not squared but rectangular, such as width-wise (projection dominant) and height-wise (detector dominant) filters. Reference can be made to, e.g., "Machine Friendly Machine Learning: Interpretation of Computed Tomography Without Image Reconstruction", by Lee, H., et al., Sci Rep 9, 15540 (2019).

d. Consider a neural network architecture that mimics more explicitly the iterative update steps of an optimization problem, and hence includes prior information about the forward model of the system in its definition. Reference can be to, e.g., "Learned Primal Dual Reconstruction", by Adler, J and Oktem, O., IEEE Transactions on Medical Imaging (2018).

e. Customize the training loss: instead of a basic mean-squared error (MSE), consider quality metrics of interest in the training loss, such as bias, contrast-to-noise ratio (CNR) or a regularized loss.

f. Incorporate multiple forms of data as input to the network. For example, a combination of energy-bin sinograms and material-decomposed sinograms can be used as input to the network. It is also possible to combine energy-bin sinograms and/or material-decomposed sinograms with energy-bin images and/or material-decomposed images as input to the network. Alternatively, a representation of a derivative of a likelihood function or of the Cramer-Rao lower bound of basis image noise can be combined with material-decomposed sinograms as input to the network. All the above-mentioned combinations of input data can be used together with two or more basis-material sinograms or images from at least two different basis image representation sets.

g. Boost the representation capacity of the network with spectral attention modules: the energy-bin data could also an input of the network, and some information could be extracted with spectral attention modules in the network architecture. Reference can be made to, e.g., "Learning Spectral-Spatial Prior Via 3DDNCNN for Hyperspectral Image Deconvolution" by X. Wang et al., ICASSP (2020).

A different decomposition:

h. Tissue/diagnostic/anatomical decomposition: deep learning allows for a flexible training process, from which one can infer an interesting transformation of the input data without the need of defining an underlying model. Therefore, we may not necessarily need to obtain the three-basis material decomposition, but rather get a (even bigger than three) tissue-types decomposition, diagnostic-regions decomposition of anatomical-section decomposition. As soon as there are labeled pairs of input/output training data, a similar set-up could be used for these purposes.

Figure 14:
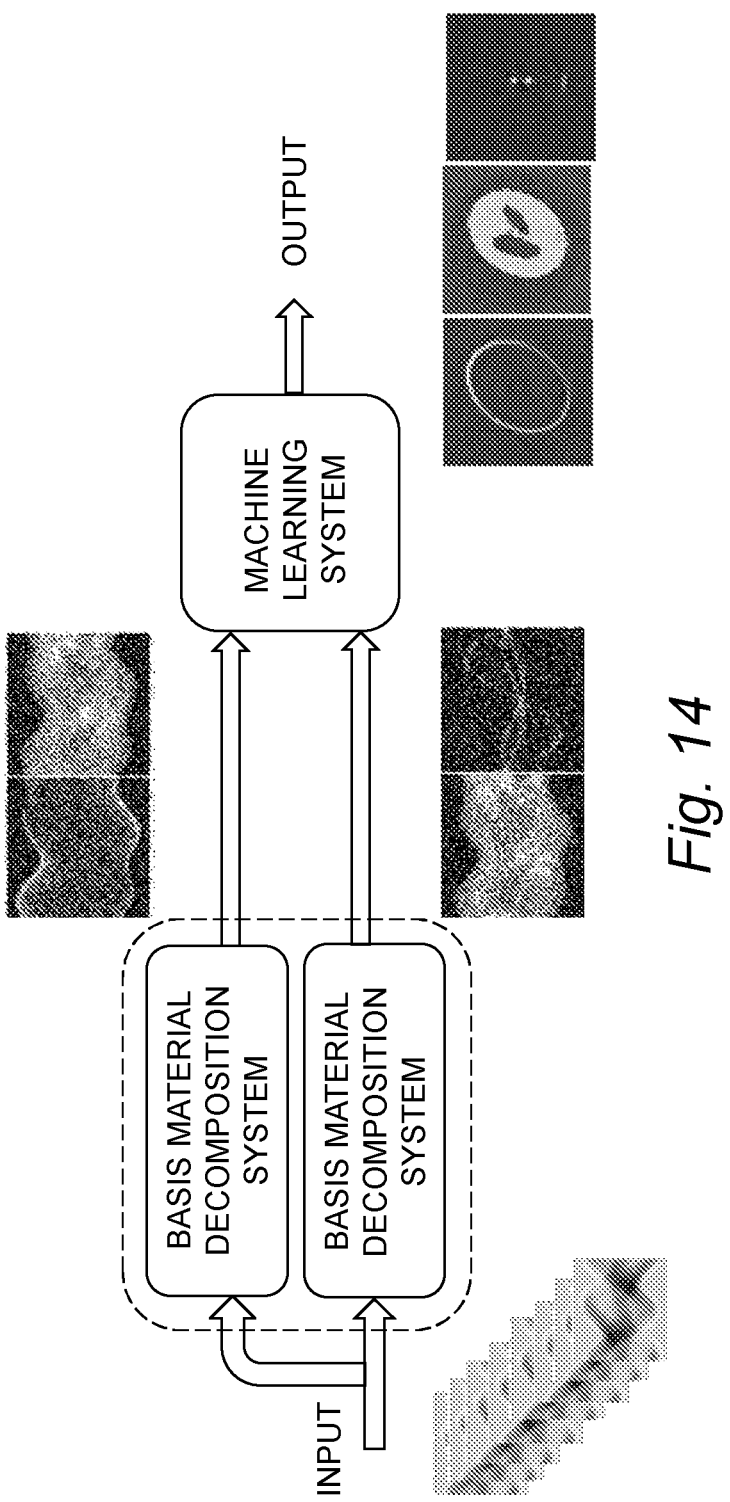
FIG. 14 is a schematic diagram illustrating an exemplary embodiment of the proposed invention, where a machine learning system maps material-decomposed sinograms to reconstructed images.
Figure 15:
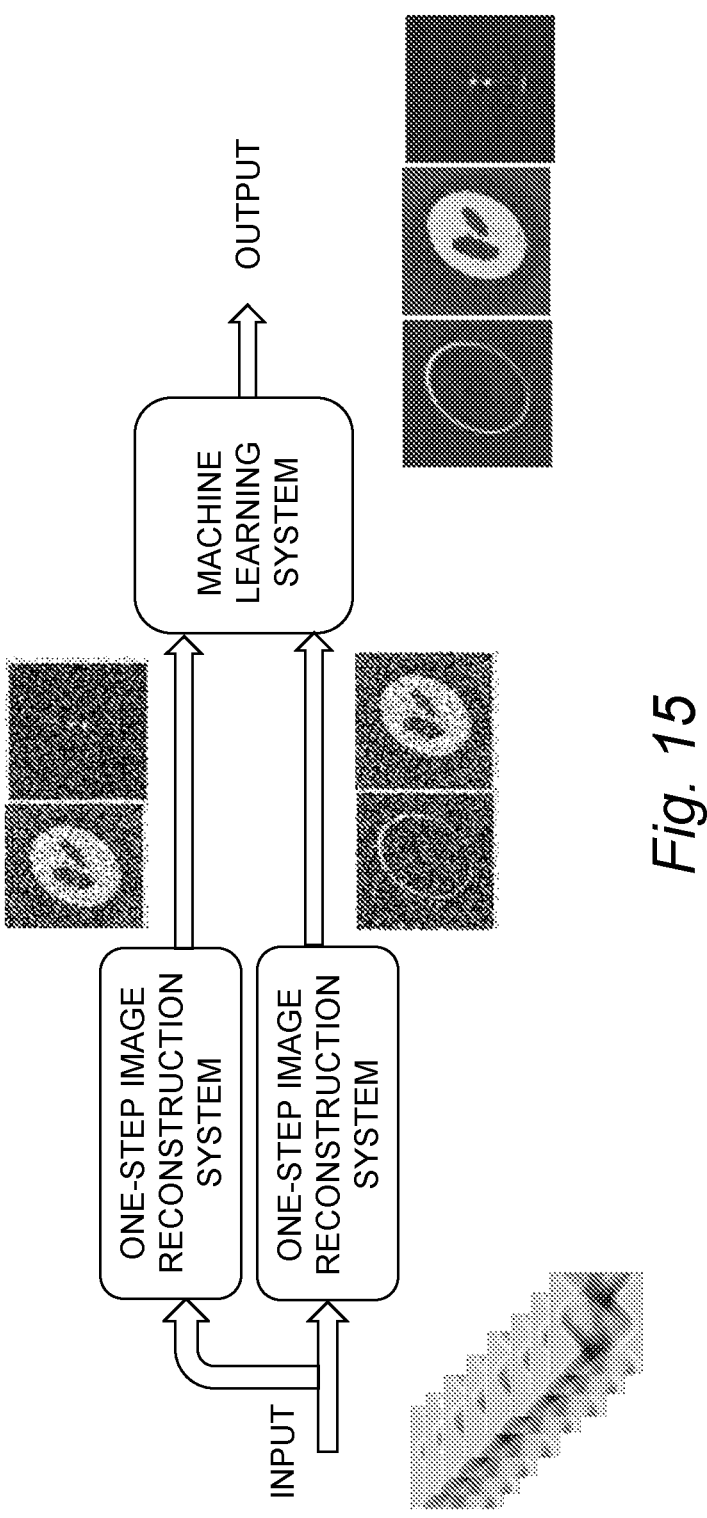
FIG. 15 is a schematic diagram illustrating an exemplary embodiment of the proposed invention, where one-step image reconstruction system provides material-decomposed images which are used as input to a machine learning system.
Figure 16:
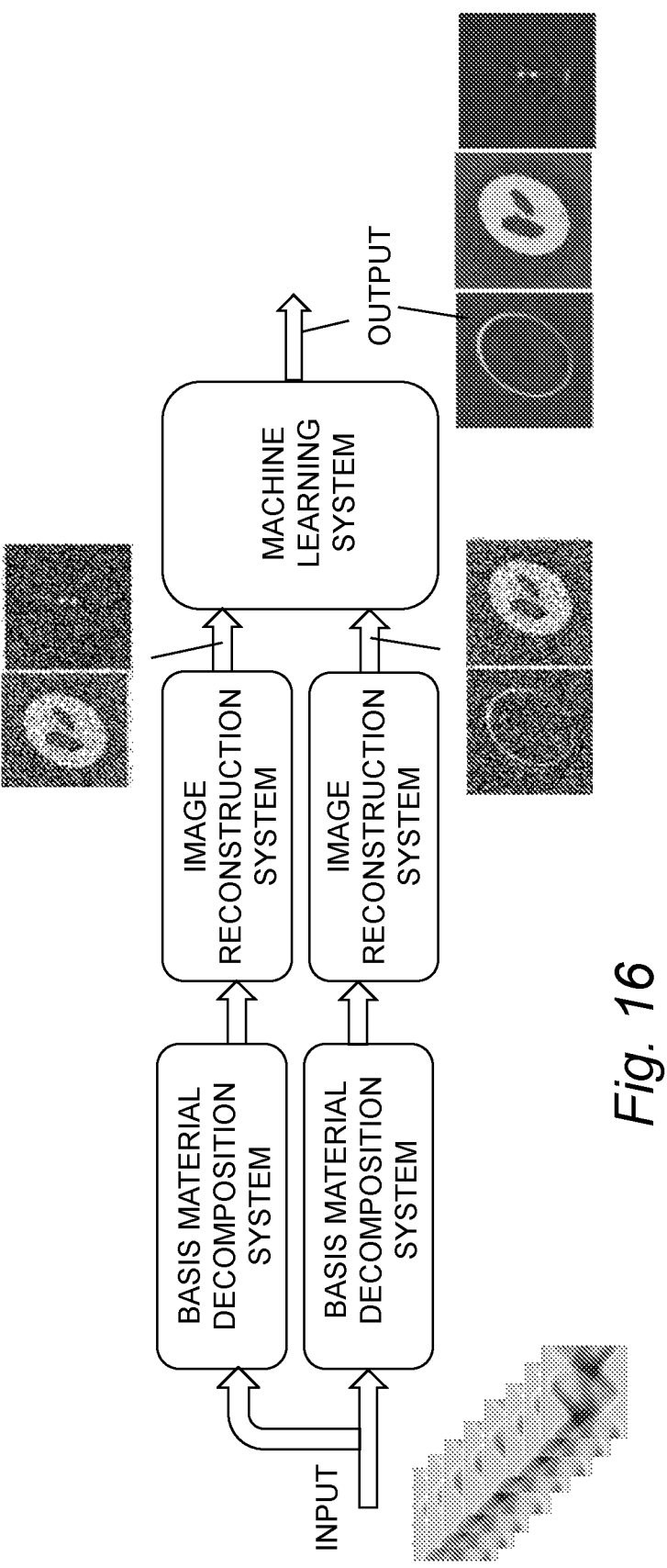
FIG. 16 is a schematic diagram illustrating an exemplary embodiment of the proposed invention, where a two-step image reconstruction method, comprising a basis material decomposition system followed by an image reconstruction system, provides material-decomposed images which are used as input to a machine learning system.

Consider CT reconstruction in the process:

i. A one-step decomposition plus reconstruction: the proposed method assumes that CT reconstruction (from sinogram to image space) is an independent step. A neural network could handle both steps simultaneously. For instance, an unrolled iterative-optimization network trained to transform the biased material-decomposed sinogram directly into a debiased material-decomposition reconstructed images. In this way, the neural network could solve both steps (decomposition and reconstruction) in a more optimal way (in computation and accuracy). Reference can be made to, e.g., "Learned Primal-Dual Reconstruction" by J. Adler and 0. Oktem, IEEE Transactions on Medical Imaging, (2018). Such an unrolled iterative-optimization network may be based on a gradient descent optimization method, a primal-dual optimization method, or an alternating direction method of multipliers method. This type of unrolled optimization method has favorable properties such as having fewer network weights and performing better with small amounts of training data, compared other neural-network architectures. Such a one-step method may for example take a combination of basis image data and energy-resolved measured data as input. Alternatively, a one-step reconstruction method may be implemented as an iterative algorithm. A non-limiting example of this embodiment of the invention is illustrated in FIG. 14, where a machine learning system processes material-decomposed sinograms from at least two basis material decompositions and generates a set of material-decomposed images as output.

j. Alternatively, the material decomposition steps used to generate the original basis image sets may comprise a one-step reconstruction method, yielding reconstructed basis images as output. These are then processed by a machine learning algorithm to yield one or more output basis images. A non-limiting example of this embodiment of the invention is illustrated in FIG. 15, where a machine learning system processes material-decomposed images from at least two one-step image reconstructions, which transform input energy bin sinograms to material-decomposed reconstructed images, and generates a set of material-decomposed images as output. A further alternative is to generate the original basis image sets with a two-step basis decomposition method, which comprises a first step wherein basis material decomposition is carried out separately for each projection ray and a second step wherein the resulting basis sinograms are taken as input to an image reconstruction algorithm to yield reconstructed basis images, which are then processed by a machine learning algorithm to yield one or more output basis images. A non-limiting example of this embodiment of the invention is illustrated in FIG. 16, where a machine learning system processes material-decomposed images from at least two two-step image reconstructions, each consisting of a basis material decomposition step followed by an image reconstruction step, and generates a set of material-decomposed images as output. Said one-step or two-step decomposition methods may optionally incorporate prior information, such as a prior image or a volume conservation constraint, or incorporate information about the noise level or correlation structure in the sinogram or in the image, exemplarily information about the Cramer-Rao lower bound.

It will be appreciated that the mechanisms and arrangements described herein can be implemented, combined and re-arranged in a variety of ways.

For example, embodiments may be implemented in hardware, or at least partly in software for execution by suitable processing circuitry, or a combination thereof.

The steps, functions, procedures, and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, and/or blocks described herein may be implemented in software such as a computer program for execution by suitable processing circuitry such as one or more processors or processing units.

Figure 17:
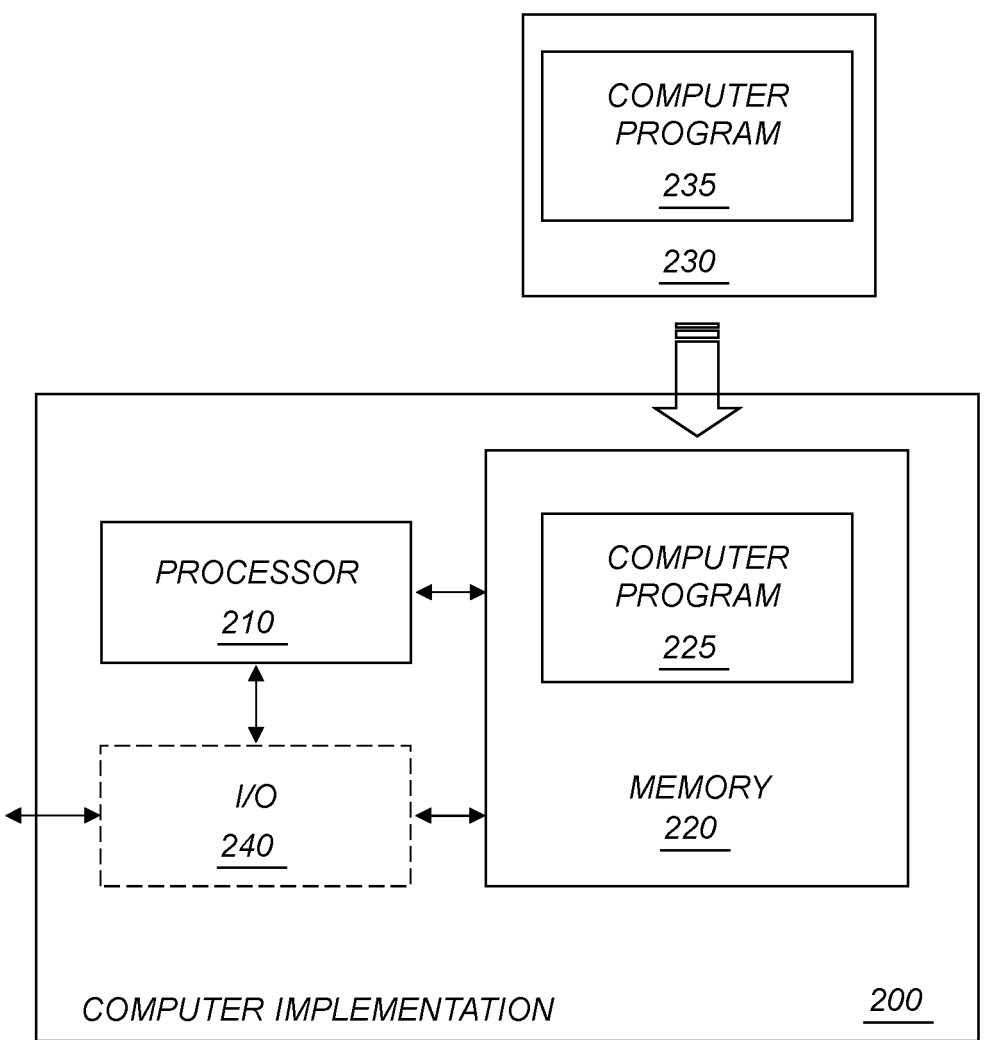
FIG. 17 is a schematic diagram illustrating an example of a computer implementation according to an embodiment.

FIG. 17 is a schematic diagram illustrating an example of a computer implementation according to an embodiment. In this particular example, the system 200 comprises a processor 210 and a memory 220, the memory comprising instructions executable by the processor, whereby the processor is operative to perform the steps and/or actions described herein. The instructions are typically organized as a computer program 225; 235, which may be preconfigured in the memory 220 or downloaded from an external memory device 230. Optionally, the system 200 comprises an input/output interface 240 that may be interconnected to the processor(s) 210 and/or the memory 220 to enable input and/or output of relevant data such as input parameter(s) and/or resulting output parameter(s).

In a particular example, the memory comprises such a set of instructions executable by the processor, whereby the processor is operative to:

obtain at least one representation of energy-resolved x-ray data, perform at least two basis material decompositions based on said at least one representation of energy-resolved x-ray data to generate at least two original basis image representation sets, extract at least two basis image representations from at least two of said original basis image representation sets, and process the extracted basis image representations by data processing based on machine learning to generate at least one representation of output image data.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

The proposed technology also provides a computer-program product comprising a computer-readable medium 220; 230 having stored thereon such a computer program.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Method flows may be regarded as a computer action flows, when performed by one or more processors. A corresponding device, system and/or apparatus may be defined as a group of function modules, where each step performed by the processor corresponds to a function module. In this case, the function modules are implemented as a computer program running on the processor. Hence, the device, system and/or apparatus may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein.

Alternatively, it is possible to realize the modules predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method of image reconstruction based on energy-resolved x-ray data, comprising:

collecting, via a multi-bin photon counting x-ray detector, at least one representation of energy-resolved x-ray data, performing, using a basis material decomposition system, at least two basis material decompositions based on said at least one representation of energy-resolved x-ray data to generate at least two original basis image representation sets, obtaining or selecting, by a processor, at least two basis image representations from at least two of said original basis image representation sets, and processing, by a trained machine learning model, said obtained or selected at least two basis image representations by data processing based on machine learning to generate at least one representation of output image data, wherein said data processing is configured to map said obtained or selected basis image representations, originating from said at least two basis material decompositions, into said at least one representation of output image data based on machine learning, and wherein said machine learning model is trained to reduce bias and noise in the at least one representation of output image data and to generate a basis image representation set with a greater number of basis function than any of said at least two original basis image representation sets.

2. The method of claim 1, wherein said data processing based on machine learning is configured to map said obtained or selected at least two basis image representations to said at least one representation of output image data by means of a trained neural network, support vector machine or decision-tree based implementation.

3. The method of claim 2, wherein said trained neural network, support vector machine or decision-tree based implementation is trained on at least one of measured patient image data or phantom image data, or from simulated image data based on numerical phantoms.

4. The method of claim 2, wherein said trained neural network, support vector machine or decision-tree based implementation is trained on a first type of images, and adapted for use on a second type of images using transfer learning.

5. The method of claim 4, wherein said trained neural network, support vector machine or decision-tree based implementation is trained on non-energy-resolved CT images, and adapted for use on energy-resolved photon-counting CT images using transfer learning.

6. The method of claim 1, wherein said at least one representation of energy-resolved x-ray data originates from an x-ray detector or an intermediate storage and includes energy-resolved x-ray image data and/or energy-resolved x-ray measurement data.

7. The method of claim 6, wherein said x-ray detector is an energy-resolving photon-counting detector, also referred to as a multi-bin photon-counting x-ray detector.

8. The method of claim 1, wherein said at least one representation of output image data comprises a set of basis image representations, referred to as an output set of basis image representations, where the number of basis image representations in said output set is larger than the maximum number of basis image representations in any of said at least two original basis image representation sets.

9. The method of claim 8, wherein said output set of basis image representations has a number of basis functions, and each original basis image representation set has a respective number of basis functions, and number of the basis functions corresponding to said output set of basis image representations is a subset of, or equal to, the union of the number of basis functions corresponding to said at least two original basis image representation sets.

10. The method of claim 8, wherein said output set of basis image representations has a number of basis functions, and each original basis image representation set has a respective number of basis functions, and the number of basis functions of said obtained or selected at least two basis image representations is equal to or greater than the number of basis functions corresponding to said output set of basis image representations.

11. The method of claim 8, wherein said at least two original basis image representation sets are based on two-basis decompositions, and said output set of basis image representations is based on a three-basis decomposition.

12. The method of claim 11, wherein said data processing based on machine learning is performed by a neural network, and the neural network is trained with several two-basis image representation sets as input data and three-basis image representation sets as output data.

13. The method of claim 12, wherein said two-basis image representation sets and three-basis image representation sets have been generated from measured patient image data or phantom image data, or from simulated image data based on numerical phantoms.

14. The method of claim 1, wherein said step of processing said obtained or selected basis image representations comprises:

combining said obtained or selected basis image representations with at least one representation of non-basis image data; and processing said obtained or selected at least two basis image representations with said at least one representation of non-basis image data by said data processing based on machine learning.

15. The method of claim 14, wherein said non-basis image data includes at least one of bin counts sinogram data, log-normalized bin counts sinogram data, sum-over-bins sinogram or log-normalized data, reconstructed CT image data, and segmentation mask data.

16. The method of the claim 1, wherein said step of processing said obtained or selected basis image representations comprises:

combining said obtained or selected basis image representations with at least one representation of prior information, and processing said obtained or selected at least two basis image representations with said at least one representation of prior information by said data processing based on machine learning.

17. The method of claim 1, wherein said step of processing said obtained or selected basis image representations comprises:

combining said obtained or selected basis image representations with at least one computational representation of a physical process in an acquisition system, and processing said obtained or selected at least two basis image representations with said at least one computational representation of a physical process by said data processing based on machine learning.

18. The method of claim 1, wherein processing said obtained or selected basis image representations comprises:

combining said obtained or selected basis image representations with at least one computational representation of a statistical model for the measured data, and processing said obtained or selected at least two basis image representations with said at least one computational representation of a statistical model by said data processing based on machine learning.

19. The method of claim 1, wherein said at least one representation of output image data includes an output set of basis image representations and/or material-decomposition reconstructed images.

20. The method of claim 1, wherein said data processing based on machine learning includes deep learning post-processing, configured based on training data and said deep learning post-processing is configured to receive biased material-decomposed sinograms as input and provide de-biased material-decomposed sinograms or debiased material-decomposition reconstructed images as output.

21. The method of claim 20, wherein a set of sinograms is provided as input for two-basis decomposition to generate two or more basis image representations, and a deep learning neural network is used to transform the resulting basis image representations into a three-material decomposition.

22. A system for image reconstruction based on energy-resolved x-ray data comprising:

an input for receiving at least one representation of energy-resolved x-ray data;

a basis material decomposition system configured to perform at least two basis material decompositions based on said at least one representation of energy-resolved x-ray data to generate at least two sets of basis image representations;

a trained machine learning system having a configuration determined based on input-output-paired training data and adapted to receive at least two basis image representations from said at least two of said sets of basis image representation and process said received at least two basis image representations by machine learning-based data processing to generate at least one representation of output image data, wherein said trained machine learning system is configured to map said received at least two basis image representations, originating from said at least two basis material decompositions, into said at least one representation of output image data, and wherein said trained machine learning system is trained to reduce bias and noise in the at least one representation of output image data and to generate a basis image representation set with a greater number of basis function than any of said at least two sets of basis image representations; and an output for outputting said at least one representation of output image data.

23. The system for image reconstruction of claim 22, wherein said trained machine learning system is based on a neural network, a support vector machine or a decision-tree based implementation.

24. The system for image reconstruction of claim 22, wherein said trained machine learning system is trained on at least one of measured patient image data or phantom image data, or from simulated image data based on numerical phantoms.

25. The system for image reconstruction of claim 22, wherein said trained machine learning system is trained on a first type of images, and adapted for use on a second type of images using transfer learning.

26. The system for image reconstruction of claim 25, wherein said trained machine learning system is trained on non-energy-resolved CT images, and adapted for use on energy-resolved photon-counting CT images using transfer learning.

27. The system for image reconstruction of claim 22, wherein said at least one representation of energy-resolved x-ray data originates from an x-ray detector or an intermediate storage and includes energy-resolved x-ray image data and/or energy-resolved x-ray measurement data.

28. The system for image reconstruction of claim 27, wherein said x-ray detector is an energy-resolving photon-counting detector, also referred to as a multi-bin photon-counting x-ray detector.

29. The system for image reconstruction of claim 22, wherein said at least one representation of output image data comprises a set of basis image representations, referred to as an output set of basis image representations, where the number of basis image representations in said output set is larger than the maximum number of basis image representations in any of said at least two original basis image representation sets.

30. The system for image reconstruction of claim 29, wherein said output set of basis image representations has a number of basis functions, and each original basis image representation set has a respective number of basis functions, and the number of basis functions corresponding to said output set of basis image representations is a subset of, or equal to, the union of the number of basis functions corresponding to said at least two original basis image representation sets.

31. The system for image reconstruction of claim 22, wherein said at least one representation of output image data includes an output set of basis image representations and/or material-decomposition reconstructed images.

32. The system for image reconstruction of claim 22, wherein said system comprises at least one processor and memory, the memory comprising instructions, which when executed by the at least one processor, cause the at least one processor to perform said image reconstruction.

33. The system of claim 22, wherein said basis material decomposition system comprises processing circuitry configured to generate at least two sets of basis image representations, and said trained machine learning system comprises processing circuitry configured to generate at least one representation of output image data.

* * * * *